United States Patent
Graef et al.

(10) Patent No.: US 7,876,847 B2
(45) Date of Patent: Jan. 25, 2011

(54) GLOBAL MINIMUM-BASED MLD DEMAPPING FOR SOFT-OUTPUT MIMO DETECTION

(75) Inventors: Nils Graef, Allentown, PA (US);
Joachim S. Hammerschmidt, Mountain View, CA (US)

(73) Assignee: Agere Systems Inc., Allentown, PA (US)

( * ) Notice: Subject to any disclaimer, the term of this patent is extended or adjusted under 35 U.S.C. 154(b) by 1653 days.

(21) Appl. No.: 11/085,026

(22) Filed: Mar. 16, 2005

(65) Prior Publication Data

US 2006/0209977 A1    Sep. 21, 2006

(51) Int. Cl.
*H04L 23/02* (2006.01)
(52) U.S. Cl. .................. 375/262; 375/265; 375/347; 375/341; 714/794; 714/795; 714/792
(58) Field of Classification Search .............. 375/347, 375/341, 262, 265; 714/794, 795, 792
See application file for complete search history.

(56) References Cited

U.S. PATENT DOCUMENTS

| | | | | |
|---|---|---|---|---|
| 5,418,795 A | 5/1995 | Itakura et al. | | 371/30 |
| 5,636,251 A | 6/1997 | Citta et al. | | 375/341 |
| 6,404,828 B2 | 6/2002 | Kaewell, Jr. | | 375/341 |
| 7,065,147 B2 | 6/2006 | Ophir et al. | | 375/265 |
| 7,161,994 B2 | 1/2007 | Shah et al. | | 375/341 |
| 7,321,644 B2 | 1/2008 | Love et al. | | 375/341 |
| 7,433,432 B2 * | 10/2008 | Hoo | | 375/347 |
| 2004/0071235 A1 | 4/2004 | Love et al. | | 375/341 |
| 2006/0150058 A1 | 7/2006 | Wang et al. | | 714/755 |
| 2009/0196380 A1 * | 8/2009 | Anekoji | | 375/341 |

* cited by examiner

*Primary Examiner*—Eva Y Puente
(74) *Attorney, Agent, or Firm*—Mendelsohn, Drucker & Associates, P.C.; Kevin M. Drucker; Steve Mendelsohn

(57) ABSTRACT

A method for generating soft bit values for a multi-bit symbol encoded in one or more received signals comprises (a) for a plurality of different combinations of multiple bit values, iteratively generating, for each combination, a metric value based on the one or more received signals. The method further comprises (b) for each iteration, maintaining (i) a global extremum register containing a global extremum of the metric values; (ii) a bit occupancy for the global extremum register; and (iii) a plurality of bit $b_k$ registers, one for each bit $b_k$ in the symbol. Each bit $b_k$ register contains an extremum of the metric values corresponding to combinations of multiple bit values whose bit $b_k$ value is opposite the bit $b_k$ value of the bit occupancy for the global extremum register. The method further comprises (c) generating, for each bit $b_k$ in the symbol, a soft bit value based on a difference between the value in the global extremum register and the value in the corresponding bit $b_k$ register.

20 Claims, 11 Drawing Sheets

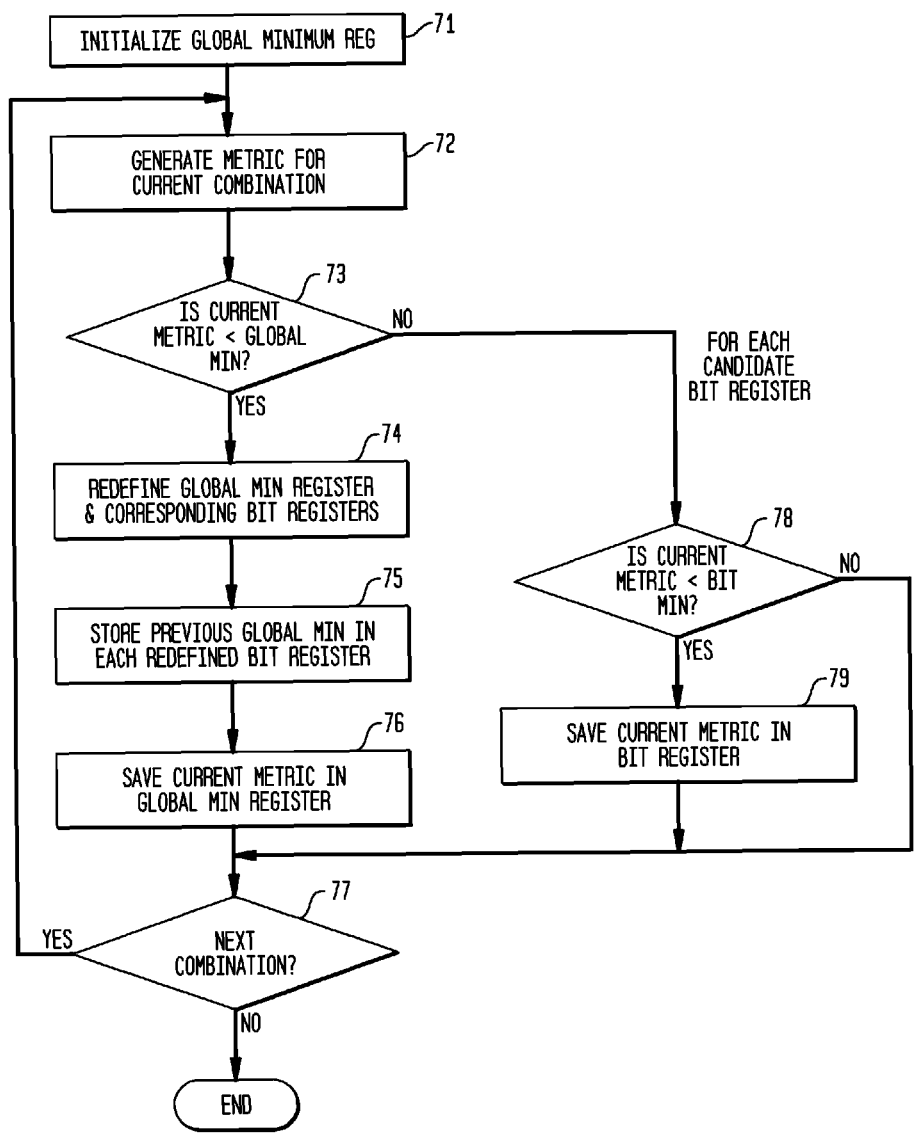

GLOBAL MINIMUM-BASED MLD DEMAPPING FOR SOFT-OUTPUT MIMO DETECTION

CROSS-REFERENCE TO RELATED APPLICATIONS

The subject matter of this application is related to the subject matter of U.S. application Ser. No. 10/990,910, filed on Nov. 17, 2004, the teachings of which are incorporated herein by reference. This application is one of a pair of U.S. patent applications, the other being application Ser. No. 11/085,025, which was filed on the same date and the teachings of which are incorporated herein by reference.

BACKGROUND OF THE INVENTION

1. Field of the Invention

The present invention relates to communication systems, and, in particular, to data detection, such as soft-output multiple-input, multiple-output (MIMO) detection, employing a maximum likelihood detection (MLD) demapper.

2. Description of the Related Art

Reliable and efficient transmission of information signals over imperfect communication channels is essential for wireless communication systems. One method of transmission is multiple-input, multiple-output (MIMO) transmission. For MIMO transmission, a transmitter sends separate signals on two or more transmit antennas, the separately transmitted signals are combined as they pass through the channel, and the receiver receives the combined signals on each of one or more receive antennas. The receiver detects and demodulates each of the transmitted signals and processes the received signals to extract the information.

One successful approach to achieving reliable transmission is multi-carrier modulation (MCM). MCM is a modulation technique that might employ several transmit antennas at the transmitter. The principle of MCM is to divide a communication channel into a number of sub-carriers (also called tones or bins), with each sub-carrier independently modulated. Information is modulated onto a tone by varying the tone's phase, amplitude, or both.

Orthogonal frequency division multiplexing (OFDM) is a form of MCM in which tone spacing is selected such that each tone is orthogonal to all other tones over the given symbol interval. OFDM wireless local area network (wireless LAN or WLAN) systems are typically designed to conform to either a contention-based wireless medium access standard such as IEEE 802.11 or a scheduled time-division duplex (TDD) wireless medium access standard such as European Telecommunications Standards Institute (ETSI) HIPER-LAN/2. In a WLAN system conforming to a contention-based standard, OFDM stations compete for access to the wireless medium using "fair contention" medium-sharing mechanisms specified in the standard. In contrast, medium access in a scheduled TDD-conforming WLAN system is controlled by a single designated station, which schedules medium access for all other transceivers.

IEEE Standard 802.11 and its extensions 802.11a/b/g specify the physical layers and medium access, control procedures for OFDM WLAN systems. For example, an 802.11a-compliant system operates in the 5-GHz radio-frequency band and provides data communication capabilities of 6, 9, 12, 18, 24, 36, 48, and 54 Mbit/s. The system uses 52 tones (numbered from −26 to 26, excluding 0) that are modulated using binary or quadrature phase shift keying (BPSK/QPSK), 16-quadrature amplitude modulation (16-QAM), or 64-QAM. In addition, the system employs forward error correction (convolutional) coding with a coding rate of ½, ⅔, or ¾.

In a MIMO wireless transmission, the signals that simultaneously arrive at each receive antenna are a mix of the signals coming from each of the various transmit antennas. Therefore, typical single-antenna demodulation (e.g., soft-slicing) techniques are not applicable, and MIMO demodulators ("demappers") are employed instead. Generally, a MIMO i generates, based on the signals coming from the various receive antennas, "soft decisions" (or "soft bits") for all bits modulated onto carriers of each transmit antenna. These soft bits are further processed to generate final "hard decisions" for the encoded data bits, for example, in a transmitted packet. Due to the random mutual cross-talk of transmit streams in the wireless MIMO channel, MIMO demapping can exhibit irregular performance. However, the performance of subsequent processing steps at the receiver (e.g., decoding) depends heavily on the quality of these initial soft-bit estimates. Consequently, a maximum degree of reliability in the demapping process is desired. Prior-art: MIMO demappers either sacrifice reliability or are relatively complex to implement.

One group of prior art MIMO demappers employs Zero-Forcing (ZF) or Minimum Mean Squared Error (MMSE) techniques to separate the various transmit streams from one another at the receiver. Separation is accomplished by applying sets of pre-processing (combining) weights to the signals of the various receive antennas, one set per transmit streamn. Then, each resulting signal stream is demapped using single antenna stream techniques.

While the approach of these MIMO demappers is relatively simple to implement, suppression of mutual cross-talk between the separated signal streams might lead to noise enhancement. In noise enhancement, the effective Signal-to-Noise Ratio (SNR) in the various reconstructed signal streams might be relatively low depending on the properties of the wireless channel, leading to significant degradation in the generation of soft bits.

Another group of prior-art MIMO demappers employs maximum-likelihood detection (MLD). For MLD, a search is performed in which ideal receive signals are constructed based on candidate transmit signals; and the (known) MIMO transmission channel. An error metric (such as the minimum squared Euclidian distance) between the actual receive signals and the various constructed ideal receive signals is used to find the best candidate for soft-bits of a particular separated signal stream. Variations of this method might be applied to each bit encoded in the signals under consideration, and the corresponding desired soft-bits extracted from the various Euclidian distance terms. In the so-called "exhaustive search" variation of MLD, all possible candidates are considered. Other methods, such as spherically constrained decoding, reduce the size of the search by testing only a certain subset of all possible candidates.

However, the complexity of the search process is typically prohibitive for high-data-rate systems. For the example of four-dimensional (i.e., real and complex components for each of two different data streams) MIMO modulation using 64-QAM, the receiver's MIMO demapper evaluates 4096 candidate metrics, and a brute-force computation of each metric includes approximately 20 multiplication operations and 20 additions. Moreover, for systems employing OFDM, the brute-force computation is performed for each OFDM subcarrier. While the number of candidate metrics may be reduced by, for example, spherically constrained decoding, a very complex process might be required in practice to identify the relevant candidates. Moreover, when the number of candidate metrics is reduced, ensuring that the true candidate is actually found is difficult. Another disadvantage is that the spherically constrained search is performed separately per soft bit.

SUMMARY OF THE INVENTION

In one embodiment, the present invention provides a method for generating soft bit values for a multi-bit symbol encoded in one or more received signals. The method comprises (a) for a plurality of different combinations of multiple bit values, iteratively generating, for each combination, a metric value based on the one or more received signals. The method further comprises (b) for each iteration maintaining (i) a global extremum register containing a global extremum of the metric values; (ii) a bit occupancy for the global extremum register; and (iii) a plurality of bit $b_k$ registers, one for each bit $b_k$ in the symbol. Each bit $b_k$ register contains an extremum of the metric values corresponding to combinations of multiple bit values whose bit $b_k$ value is opposite the bit $b_k$ value of the bit occupancy for the global extremum register. The method further comprises (c) generating, for each bit $b_k$ in the symbol, a soft bit value based on a difference between the value in the global extremum register and the value in the corresponding bit $b_k$ register.

In another embodiment, the present invention provides an apparatus for generating soft bit values for a multi-bit symbol encoded in one or more received signals. The apparatus comprises (a): means for iteratively generating, for each of a plurality of different combinations of multiple bit values, a metric value based on the one or more received signals. The apparatus further comprises (b) means for maintaining, for each iteration (i) a global extremum register containing a global extremum of the metric values; (ii) a bit occupancy for the global extremum register; and (iii) a plurality of bit $b_k$ registers, one for each bit $b_k$ in the symbol. Each bit $b_k$ register contains an extremum of the metric values corresponding to combinations of multiple bit values whose bit $b_k$ value is opposite the bit $b_k$ value of the bit occupancy for the global extremum register. The apparatus further comprises (c) means for generating, for each bit $b_k$ in the symbol, a soft bit value based on a difference between the value in the global extremum register and the value in the corresponding bit $b_k$ register.

In another embodiment, the present invention provides an apparatus for generating soft bit values for a multi-bit symbol encoded in one or more received signals. The apparatus comprises (a) a metric calculator adapted to iteratively generate, for each of a plurality of different combinations of multiple bit values, a metric value based on the one or more received signals. The apparatus further comprises (b) a comparator adapted to maintain, for each iteration (i) a global extremum register containing a global extremum of the metric values; (ii) a bit occupancy for the global extremum register; and (iii) a plurality of bit $b_k$ registers, one for each bit $b_k$ in the symbol. Each bit $b_k$ register contains an extremum of the metric values corresponding to combinations of multiple bit values whose bit $b_k$ value is opposite the bit $b_k$ value of the bit occupancy for the global extremum register. The comparator is further adapted to generate, for each bit $b_k$ in the symbol, a soft bit value based on a difference between the value in the global extremum register and the value in the corresponding bit $b_k$ register.

BRIEF DESCRIPTION OF THE DRAWINGS

Other aspects, features, and advantages of the present invention will become more fully apparent from the following detailed description, the appended claims, and the accompanying drawings in which:

FIG. 7 shows a flow diagram of processing that can be used to find minimum y values using a global min register, a bit-occupancy register, and a number of bit registers;

DETAILED DESCRIPTION

In a technique known as Soft-Output Maximum-Likelihood Detection (SO MLD), MLD is used to produce soft-decision outputs. While SO MLD is superior to other MIMO demapping schemes, such as SO-Zero Force, the complexity of the actual candidate scan renders SO MLD impractical for certain implementations. For example, a four-dimensional MIMO system using 64-QAM has traditionally required an undesirably large number (e.g., 4096) of clock cycles.

Figure 1:
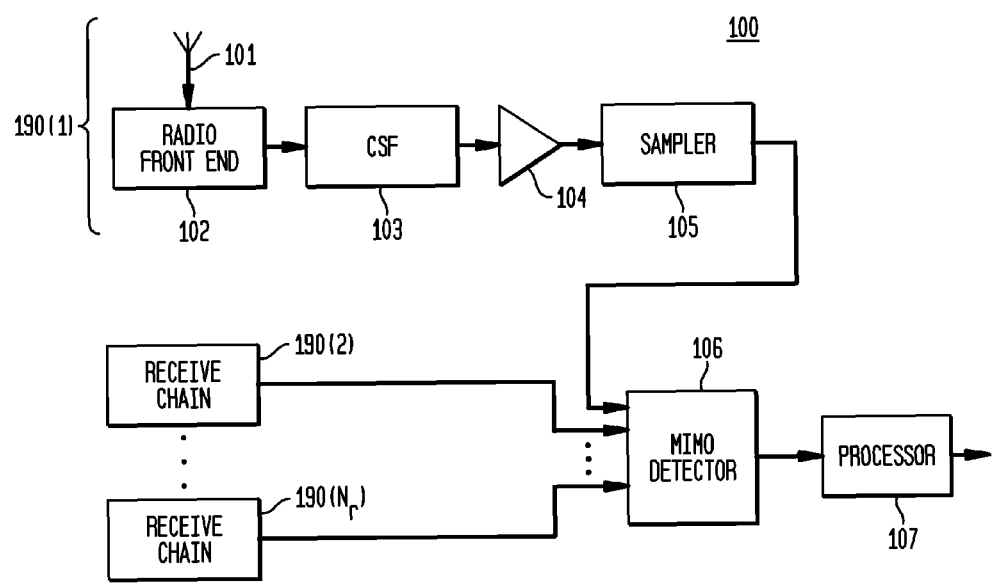
FIG. 1 shows a multiple-input, multiple-output (MIMO) receiver operating in accordance with exemplary embodiments of the present invention.

FIG. 1 shows a multiple-input, multiple-output (MIMO) receiver 100 operating in accordance with exemplary embodiments of the present invention. Receiver 100 comprises $N_r$ receive chains 190(1) through 190($N_r$). Typically, a MIMO receiver comprises two or more receive chains, where each receive chain might operate in a similar manner.

Receive chain 190(1) comprises antenna 101, radio front end (RFE) 102, channel selection filter (CASF) 103, programmable gain amplifier (PGA) 104, and sampler 105. Antenna 101 detects a signal from, for example, a wireless communication channel, where the signal might comprise two or more antenna signals generated by a MIMO transmitter. RFE 102 receives the signal from antenna 101, band filters and gain adjusts the antenna signal, and demodulates the antenna signal to base-band (BB) or near-BB.

CSF 103 filters the signal from RFE 102 so as to pass the desired information channel. For example, CSF 103 might be configured to operate for a WLAN according to the IEEE 802.11a/g standards for orthogonal frequency division multiplex (OFDM). For such configuration, CSF 103 has a bandwidth of approximately 20 MHz. PGA 104 adjusts the signal from CSF 103 to be within the range supported by sampler 105. Sampler 105 periodically time-samples the signal from PGA 104.

The remaining receive chains 190(2) . . . 190(N$_r$) may be structured and/or may function similarly or identically to receive chain 190(1) described above.

The outputs of all N$_r$ receive chains 190(1) through, 190(N$_r$) are monitored by MIMO detector 106 to detect the data from the received signal. The signal from detector 106 is applied to processor 107 for subsequent processing and decoding. While processor 107 is shown in FIG. 1 as a single element, as would be apparent to one skilled in the art, the various processing of detected (e.g., encoded) data from MIMO detector 106 might be accomplished with two or more different processors.

The exemplary embodiment of the present invention is described herein with respect to a MIMO system employing quadrature amplitude modulation (QAM) encoding of data, though the present invention is not so limited. One skilled in the art might extend the teachings herein to other systems using other forms of encoding of data into transmit symbols. For the exemplary embodiment herein, the MIMO system employs a transmitter with N$_t$=2 transmit antennas, each employing a 64-QAM encoding of data into transmit symbols.

Figure 2:
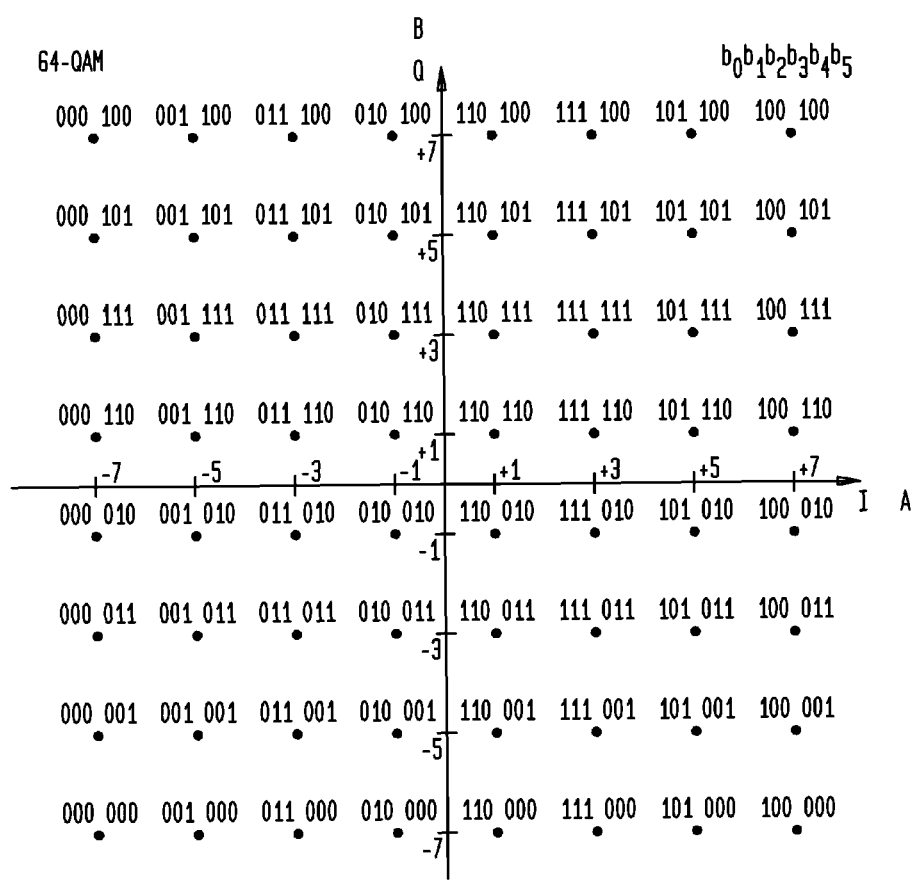
FIG. 2 shows: an exemplary 64-QAM encoding constellation as may be processed with the receiver of FIG. 1.

FIG. 2 shows an exemplary 64-QAM encoding constellation, in which each location in the constellation is represented by an in-phase (i.e., real) component I and a quadrature (i.e., imaginary) component Q, where both components range from −7 to +7 in increments of 2. As shown in FIG. 2, each location in the constellation is represented by a 6-bit value, 3: bits for I and 3 bits for Q. These bit values have been selected using Gray coding, wherein vertically or horizontally adjacent locations differ by only a single bit value (i.e., 5 of the 6 bits have the same value). These values are the actual bits that are coded into the transmitted signals for each constellation position, as will be described further later in this specification.

Referring again to FIG. 1, MIMO detector 106 implements a MIMO demapping scheme with soft-output maximum likelihood detection (SO MLD) in accordance with an exemplary embodiment of the present invention. For ease of understanding, the following gives a background of SO MLD for MIMO demapping. MIMO formulation of a log-likelihood approximation for SO MLD generates a soft-bit L(b$_k$) (also referred to herein as L$_k$) as follows in Equation (1):

$$L(b_k) = \min_{x|b_k=0} \|r - Hx\|^2 \min_{x|b_k=1} \|r - Hx\|^2, \quad (1)$$

where L(b$_k$) is the soft-bit value for the kth bit, k=0, 1, . . . , K−1, coded into the MIMO-QAM symbol. For N$_t$=2 and 64-QAM encoding, K=12, since (2 sub carriers)(6 bits per symbol)=12 bits are decoded per MIMO-OFDM constellation. The vector r is an N$_r$-dimensional receive vector, and matrix H is the (N$_r$×N$_t$)-dimensional MIMO channel matrix (characterizing the narrowband MIMO transmission wireless channel impulse response or channel coefficients), which might be estimated by the receiver through decoding of known preamble data. The transmit vector x is the N$_t$-dimensional candidate transmit vector which is a direction function f(●) (e.g., QAM mapping) of the set of all bits b={b$_k$} modulated into it, as defined by Equation (2a):

$$x = f(b) = x(b). \quad (2a)$$

The receive vector r represents the signal received from the transmission medium that corresponds to the transmit vector x$_{true}$ passed through the channel with impulse response H and corrupted with additive noise n. Thus, the receive vector r is as defined in Equation (2b):

$$r = Hx_{true} + n \quad (2b)$$

where each complex element in the vector x$_{true}$ corresponds to one constellation point of FIG. 2. For the 64-QAM modulation of FIG. 2, Gray coding is employed that specifies that any two adjacent points differ by only one bit. A MIMO demapper evaluating Equation (1) for each soft-bit attempts to find candidate vectors x for which the metric (squared Euclidian distance) term y as defined in Equation (3) is minimum:

$$y(x) = y(x(b)) = \|r - Hx(b)\|^2. \quad (3)$$

Computation of each term y(x) for the candidate x(b) typically involves a large number of complex multiplication operations and additions. Consequently, in accordance with embodiments of the present invention, each term y(x) is computed recursively using a doubly-recursive method with a candidate scanning order to reduce the overall number of computations. Additionally, certain embodiments of the present invention employ a hierarchical formulation of metric minimization expressions to reduce substantially the number of Euclidian metric tests require for SO MLD. Further, in accordance with embodiments of the present invention, partial parallelization with a high degree of component-sharing between sub-units is employed to permit a compact candidate scan implementation. Moreover, as will be discussed in further detail below, certain embodiments of the present invention implement a final minimization stage that exploits the fact that one of the two minimum Euclidian metrics required for each MIMO-modulated bit is always identical to the overall global minimum, thereby reducing the size of the memory required to store the individual Euclidian metrics.

Figure 3:
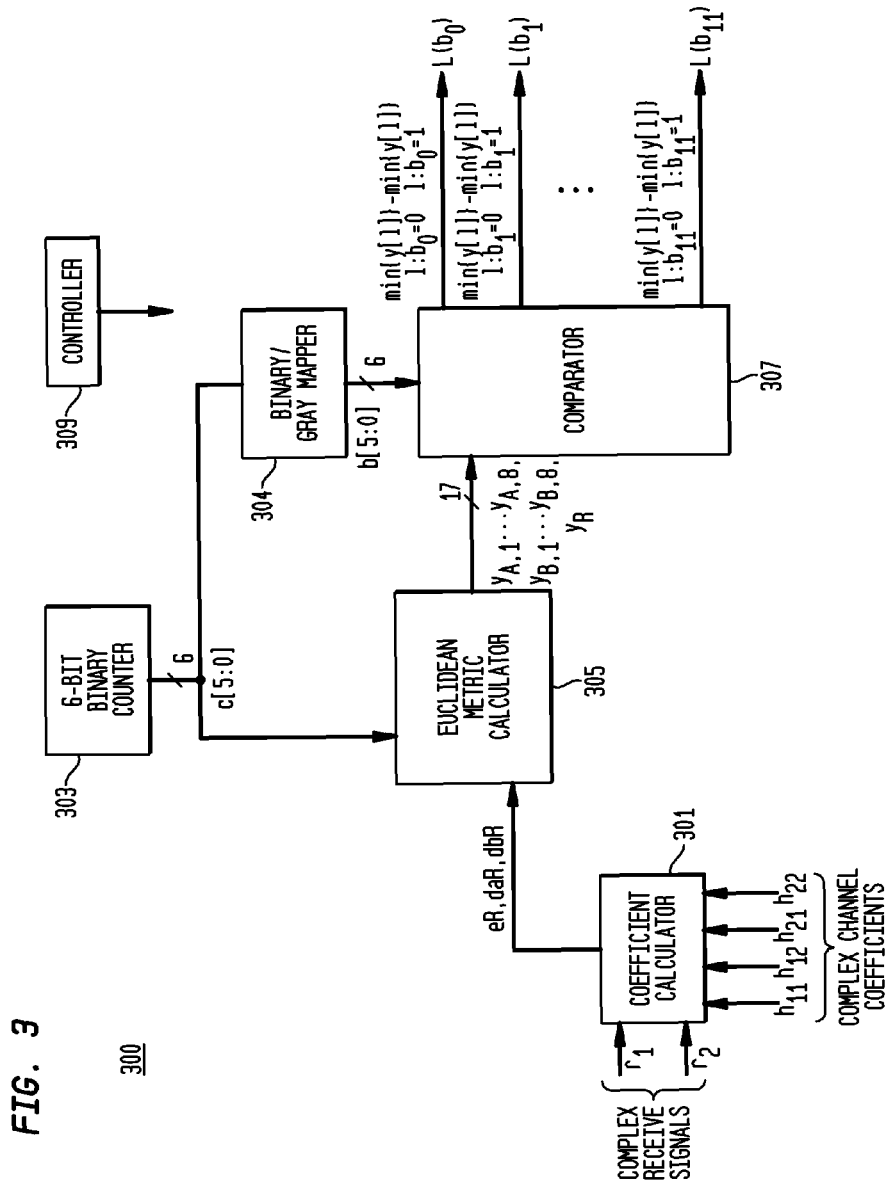
FIG. 3 shows an exemplary implementation for a MIMO demapper as might be employed for the MIMO detector of FIG. 1.

FIG. 3 shows an exemplary implementation for a MIMO demapper 300 as might be employed for MIMO detector 106 of FIG. 1. MIMO demapper 300 comprises coefficient calculator (coeff-calc) 301, counter 303, mapper 304, Euclidian metric calculator (EMC) 305, comparator unit 307, and controller 309. Controller 309 might be employed to coordinate processing implemented by the various elements of FIG. 3.

Counter 303 is employed to provide the, clock cycle i to EMC 305 and mapper 304. Counter 303 might be implemented as a 6-bit binary counter for 64-QAM. In certain implementations, a 12-bit counter providing 4096 clock cycles would be used to evaluate candidate vectors, i.e., i= 0, . . . , 4095, one clock cycle for each of 64$^2$=4096 candidate vectors. However, in this embodiment of the present invention, the number of clock cycles is reduced to 64, as will be explained in further detail below.

Coeff-calc 301 computes various coefficients based on (a) the received signal symbol (in-phase and quadrature) components for each receive antenna r and (b) the estimated MIMO channel impulse response matrix H measured and/or estimated separately by the receiver.

In a four-dimensional QAM-MIMO system, there are four candidate variables (A$_1$, B$_1$, A$_2$, B$_2$): one real component (A$_i$) and one imaginary component (B$_i$) for each transmit antenna dimension. Following the 64-QAM constellation of FIG. 2, each one of these candidate variables takes a value from the, signaling alphabet Ω={Ω$_1$, Ω$_2$, . . . Ω$_8$}={−7, −5, −3, −1, 1, 3, 5, 7}. When, in the candidate scanning process, one of these variables is changed in the overall expression for y, the metric y is updated according to this change. The Euclidian distance term y in compact vector form is provided in Equation (4a):

$$y = w_o + \begin{pmatrix} w_{L1} \\ w_{L2} \\ w_{L3} \\ w_{L4} \end{pmatrix}^T \begin{pmatrix} A_1 \\ B_1 \\ A_2 \\ B_2 \end{pmatrix} + \begin{pmatrix} w_{S1} \\ w_{S1} \\ w_{S2} \\ w_{S2} \end{pmatrix}^T \begin{pmatrix} A_1^2 \\ B_1^2 \\ A_2^2 \\ B_2^2 \end{pmatrix} + \begin{pmatrix} w_{C1} \\ w_{C2} \\ -w_{C2} \\ w_{C1} \end{pmatrix}^T \begin{pmatrix} A_1 A_2 \\ A_1 B_2 \\ B_1 A_2 \\ B_1 B_2 \end{pmatrix}. \quad (4a)$$

The w coefficients are functions of the channel coefficients and receive signals in the subcarriers of the implementation, and some of these coefficients always have the same magnitudes, as set forth in Equations (4b) through (4i), wherein the subscripts "L", "S", and "C", respectively, denote "linear," "square," and "cross" in accordance with the association of candidate variables:

$$w_{L1} \triangleq w_1, \quad (4b)$$

$$w_{L3} \triangleq w_3, \quad (4c)$$

$$w_{S1} \triangleq w_5 w_6, \quad (4)$$

$$w_{C1} \triangleq w_9 = w_{12}, \quad (4e)$$

$$w_{L2} \triangleq w_2, \quad (4f)$$

$$w_{L4} \triangleq w_4, \quad (4g)$$

$$w_{S2} \triangleq i\ w_7 = w_8, \quad (4h)$$

$$w_{C2} \triangleq w_{10} = -w_{11}. \quad (4i)$$

In exhaustive search-based SO MLD, investigation of all Euclidian metrics is used to determine the soft bit values $L_k$ based on the following Equation (4j):

$$L_k = \min_{A_1, B_1, A_2, B_2 | b_k = 0} \{y(A_1, B_1, A_2, B_2)\} - \min_{A_1, B_1, A_2, B_2 | b_k = 1} \{y(A_1, B_1, A_2, B_2)\} \quad (4j)$$

As is demonstrated in Equation (4a), there are no cross-terms in y between candidate variables relating to the same transmit antenna. This fact can be exploited by separating the Euclidian distance term. (metric) y of Equation (4a) into a plurality of sub-terms. (sub-metrics) $y_A$, $y_B$, and $y_R$. This separation into sub-terms permits the application of a hierarchical formulation of the, minimization term of Equation (4j), as shown in the following Equation (4k), which introduces the three Euclidian sub-terms $y_A$, $y_B$, and $y_R$, as separately defined in the following Equations (4l-4n):

$$L_k = \min_{A_2, B_2} \left\{ \min_{A_1} y_A(A_1, A_2, B_2) + \min_{B_1} y_B(B_1, A_2, B_2) + y_R(A_2, B_2) \right\} \bigg|_{b_k = 0} - \min_{A_2, B_2} \left\{ \min_{A_1} y_A(A_1, A_2, B_2) + \min_{B_1} y_B(B_1, A_2, B_2) + y_R(A_2, B_2) \right\} \bigg|_{b_k = 1}, \quad (4k)$$

$$y_A(A_1, A_2, B_2) \triangleq w_{L1} A_1 + w_{S1} A_1^2 + w_{C1} A_1 A_2 + w_{C2} A_1 B_2, \quad (4l)$$

$$y_B(B_1, A_2, B_2) \triangleq w_{L2} B_1 + w_{S1} B_1^2 - w_{C2} B_1 A_2 + w_{C1} B_1 B_2, \quad (4m)$$

$$y_R(A_2, B_2) \triangleq w_{L3} A_2 + w_{L4} B_2 + w_{S2} A_2^2 + w_{S2} B_2^2. \quad (4n)$$

As can be seen from Equations (4l) through (4n), while candidate variables $A_2$- and $B_2$ appear in the formulas for each of sub-terms $y_A$, $y_B$, and $y_R$, there is at least one candidate variable for each of the sub-terms $y_A$, $y_B$, and $y_R$ on which that sub-term does not depend, as follows: Sub-term $y_A$ does not depend on $B_1$, sub-term $y_B$ does not depend on $A_1$, and sub-term $y_R$ does not depend on either $A_1$ or $B_1$. Thus, sub-term $y_A$ can be minimized without taking into account $B_1$. Likewise, sub-term $y_B$ can be minimized without taking into account $A_1$. Sub-term $y_R$ can be minimized without taking into account either of candidate variables $A_1$ and $B_1$. This large degree of decoupling can be further exploited to reduce computational complexity, since a candidate scan for each of the three sub-terms $y_A$, $y_B$, and $y_R$ may be performed using fewer than all four of candidate variables $A_1$, $B_1$, $A_2$, and $B_2$.

Coded bits $b_{0,1,2}$, $b_{3,4,5}$, $b_{6,7,8}$, and $b_{9,10,11}$ (see FIG. 2) correspond to the candidate variables $A_1$, $B_1$, $A_2$, and $B_2$, respectively, and the terms set forth in Equations (4o) through (4r) can be stated for the various soft bits:

$k = 0, 1, 2$: (4o)
$$L_k = \min_{A_2, B_2} \left\{ \min_{A_1 | b_k = 0} y_A(A_1, A_2, B_2) + \min_{B_1} y_B(B_1, A_2, B_2) + y_R(A_2, B_2) \right\} - \min_{A_2, B_2} \left\{ \min_{A_1 | b_k = 1} y_A(A_1, A_2, B_2) + \min_{B_1} y_B(B_1, A_2, B_2) + y_R(A_2, B_2) \right\},$$

$k = 3, 4, 5$: (4p)
$$L_k = \min_{A_2, B_2} \left\{ \min_{A_1} y_A(A_1, A_2, B_2) + \min_{B_1 | b_K = 0} y_B(B_1, A_2, B_2) + y_R(A_2, B_2) \right\} - \min_{A_2, B_2} \left\{ \min_{A_1} y_A(A_1, A_2, B_2) + \min_{B_1 | b_k = 1} y_B(B_1, A_2, B_2) + y_R(A_2, B_2) \right\},$$

$k = 6, 7, 8$: (4q)
$$L_k = \min_{A_2 | b_k = 0, B_2} \left\{ \min_{A_1} y_A(A_1, A_2, B_2) + \min_{B_1} y_B(B_1, A_2, B_2) + y_R(A_2, B_2) \right\} - \min_{A_2 | b_k = 1, B_2} \left\{ \min_{A_1} y_A(A_1, A_2, B_2) + \min_{B_1} y_B(B_1, A_2, B_2) + y_R(A_2, B_2) \right\},$$

$k = 9, 10, 11$: (4r)
$$L_k = \min_{A_2, B_2 | b_k = 0} \left\{ \min_{A_1} y_A(A_1, A_2, B_2) + \min_{B_1} y_B(B_1, A_2, B_2) + y_R(A_2, B_2) \right\} - \min_{A_2, B_2 | b_k = 1} \left\{ \min_{A_1} y_A(A_1, A_2, B_2) + \min_{B_1} y_B(B_1, A_2, B_2) + y_R(A_2, B_2) \right\}.$$

All of the sub-terms in Equations (4o-r) have at most three arguments. Since each candidate variable can assume one of eight values from the signaling alphabet, in 64-QAM, no more than $8^3 = 512$ tests need to be performed for each sub-term, which is exploited by the parallel architecture described below.

In evaluating Equations (o-r), all possible values of $A_1$ are investigated for $y_A$, for given candidate variables $A_2$ and $B_2$ (the "outer" variables in the minimization). Likewise, all possible values of $B_1$ are investigated for $y_B$. The third sub-term, $y_R$, depends only on the outer variables. Accordingly, the eight possibilities for each one of the other two inner terms ($y_A$ and $y_B$) can be parallelized so as to process a given combination of $A_2$ and $B_2$ in a single clock cycle. This may be accomplished by defining eight concurrent $y_A$ terms, $y_{A,1}$ to $y_{A,8}$, each of which assumes the role of $y_A$ for one fixed value of $A_1$ from the signal alphabet $\Omega$, as provided in Equation (4s).

$$y_{A,l} = y_A(A_1 = \Omega_l, A_2, B_2), \quad 1 \leq l \leq 8, \quad (4s)$$

wherein l denotes the l-th element of the alphabet $\Omega$. The corresponding eight concurrent $y_B$ terms, $y_{B,1}$ to $y_{B,8}$, are defined as provided in Equation (4t):

$$y_{B,l} = y_B(B_1 = \Omega_l, A_2, B_2), \quad 1 \leq l \leq 8. \quad (4t)$$

Using Equations (4l-n) and the signal alphabet $\Omega = \{\Omega_1, \Omega_2, \ldots \Omega_8\}, = (-7, -5, -3, -1, 1, 3, 5, 7)$, the following Equations (4u-w) may be derived:

$$y_{A,l}(A_2, B_2) = w_{L1}\Omega_l + w_{S1}\Omega_l^2 + w_{C1}\Omega_l A_2 + w_{C2}\Omega_l B_2, \quad 1 \leq l \leq 8, \quad (4u)$$

$$y_{B,l}(A_2, B_2) = w_{L2}\Omega_l + w_{S1}\Omega_l^2 - w_{C2}\Omega_l A_2 + w_{C1}\Omega_l B_2, \quad 1 \leq l \leq 8, \quad (4v)$$

$$y_R(A_2, B_2) = w_{L3}A_2 + w_{L4}B_2 + w_{S2}A_2^2 + w_{S2}B_2^2. \quad (4W)$$

Hence, all of the terms $y_{A,l}, y_{B,l}, 1 \leq l \leq 8$, and $y_R$, which are now functions of $(A_2, B_2)$ only, may be maintained in parallel and evaluated in the overall minimization according to Equations (4o-r), which can be performed recursively, as will be described in further detail below.

At each of the 64 different clock cycles (as dictated by counter 303), Euclidian metric calculator 305 generates, and provides to comparator 307, 17 Euclidian distance measures $y_{A,1}$ to $y_{A,8}, y_{B,1}$ to $y_{B,8}$, and $y_R$ corresponding to one of the 64 different combinations of $A_2$ and $B_2$ using the coefficients received from coefficient calculator 301, as will be described in further detail below. Each set of 17 distance measures corresponds to the sub-terms for 64 different y candidates, i.e., a hypothesis that the current received symbol corresponds to one of the 64 different candidates that include the corresponding values of $A_2$ and $B_2$.

Comparator unit 307, in the course of the whole 64-cycle, 4096-candidate scan, determines the minimum y values for each of the two possible values (0, 1) of each bit, by comparing the current y value for the current value of candidate variables under consideration with the previous minimum of y. At the end of the process, comparator unit 307 provides the differences between these two possible values (0,1) to subsequent processing (not shown in FIG. 3) as the desired SO MLD soft-bits ($L(b_k)$ values).

Mapper 304 generates values to scan two (i.e., $A_2, B_2$) of the four candidate variables ($A_1, B_1, A_2, B_2$) in a specific order based on the 6-bit binary value from counter. 303. Since candidate variables $A_1$ and $B_1$ have been decoupled and individually parallelized over all possible alphabet signals for a given combination of $A_2$ and $B_2$, no actual scan of candidate variables $A_1$ and $B_1$ is necessary.

The 6-bit counter values c in the sequence provided by counter 303 are transformed into the 6-bit Gray-coded values of FIG. 2 for candidate variables $A_2$ and $B_2$ following the scanning sequence of FIG. 5 (described below) by mapper 304, such that only one candidate variable is varied at a given time. This scan sequence corresponds to a zig-zag pattern in FIG. 2 starting from the lower left corner, proceeding left to right to the lower right corner, moving up one row, proceeding right to left, moving up one row, and so on, until reaching the upper left corner at the end of the scan sequence. For this zig-zag scan, both candidate variables $A_2$ and $B_2$ start at their minimum value of $-7$, where $A_2$ is scanned from $-7$ to $+7$ (in increments of 2) or from $+7$ to $-7$ (in-decrements of 2) for each successive value of $B_2$ from $-7$ to $+7$ (in increments of 2). The candidate variables $A_2$ and $B_2$ are identically scanned within both Euclidian metric calculator 305 and comparator 307.

Figure 4:
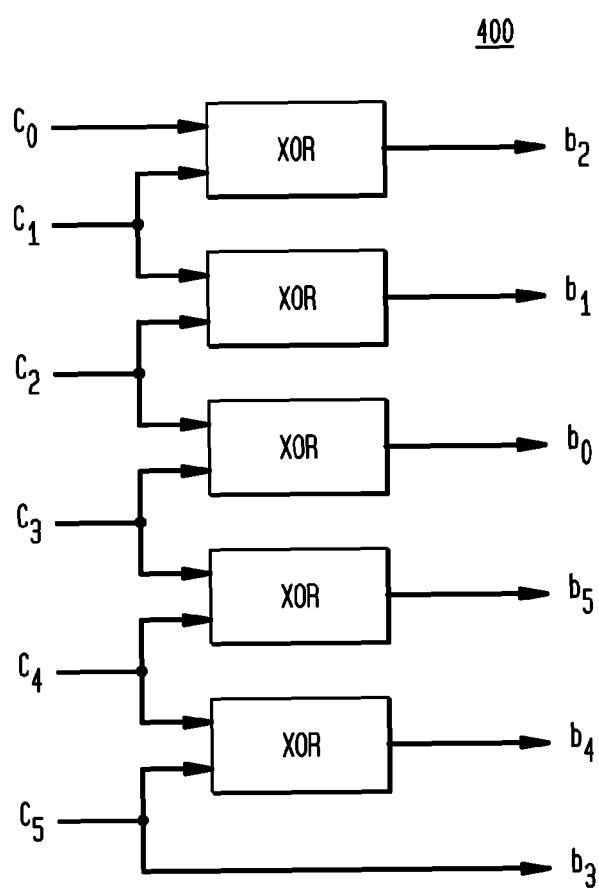
FIG. 4 shows an exemplary implementation for the mapper of FIG. 3.

FIG. 4 shows an exemplary implementation 400 for mapper 304 of FIG. 3 to generate bit values $b_0$-$b_5$ for the candidate variables $A_2$ and $B_2$. The inputs $c_0$-$c_5$ are the 6 bits provided by the 6-bit binary counter 303. Elements labeled "XOR" perform an exclusive logic OR on the identified input bits. The scan employs segments of three bits, where each 3-bit segment corresponds to one of the candidate variables ($A_2$, $B_2$). In the exemplary mapper implementation 400 shown in FIG. 4, the Gray-coded mapping is performed such that $\{-7, -5, -3, -1, +1, +3, +5, +7\}$ is mapped to $(b_2, b_1, b_0)$ and $(b_5, b_4, b_3)$ as $\{000, 001, 010, 011, 100, 101, 110, 111\}$ based on truth table provided as the following Table 1. In Table 1, the first column provides the clock cycle number=, ..., 63, i.e., the binary counter counts from 0 to 63, where the 6-bit output c[5:0] equals the binary representation of this number i. The second column illustrates the upper 3 bits ($c_5, c_4, c_3$) of the binary counter. The third column illustrates the lower 3 bits ($c_2, c_1, c_0$) of the binary counter. The fourth column illustrates the value of the candidate variable $B_2$ at clock cycle i. The fifth column illustrates the values of the Gray-encoded bits $b_5, b_4, b_3$ for candidate variable $B_2$. The sixth column illustrates the value of the candidate variable $A_2$ at clock cycle i. The seventh column illustrates the values of the Gray-encoded bits $b_2, b_1, b_0$ for candidate variable $A_2$.

TABLE 1

Truth Table for Gray-Coded Mapping

| | INPUT | | OUTPUT | | | |
|---|---|---|---|---|---|---|
| i | $c_5, c_4, c_3$ | $c_2, c_1, c_0$ | $B_2[i]$ | $b_5, b_4, b_3$ | $A_2[i]$ | $b_2, b_1, b_0$ |
| 0 | 000 | 000 | −7 | 000 | −7 | 000 |
| 1 | | 001 | | | −5 | 100 |
| 2 | | 010 | | | −3 | 110 |
| 3 | | 011 | | | −1 | 010 |
| 4 | | 100 | | | +1 | 011 |
| 5 | | 101 | | | +3 | 111 |
| 6 | | 110 | | | +5 | 101 |
| 7 | | 111 | | | +7 | 001 |
| 8 | 001 | 000 | −5 | 100 | +7 | 001 |
| 9 | | 001 | | | +5 | 101 |
| 10 | | 010 | | | +3 | 111 |
| 11 | | 011 | | | +1 | 011 |
| 12 | | 100 | | | −1 | 010 |
| 13 | | 101 | | | −3 | 110 |
| 14 | | 110 | | | −5 | 100 |
| 15 | | 111 | | | −7 | 000 |
| 16 | 010 | 000 | −3 | 110 | −7 | 000 |
| 17 | | 001 | | | −5 | 100 |
| 18 | | 010 | | | −3 | 110 |
| 19 | | 011 | | | −1 | 010 |
| 20 | | 100 | | | +1 | 011 |
| 21 | | 101 | | | +3 | 111 |
| 22 | | 110 | | | +5 | 101 |
| 23 | | 111 | | | +7 | 001 |
| 24 | 011 | 000 | −1 | 010 | +7 | 001 |
| 25 | | 001 | | | +5 | 101 |
| 26 | | 010 | | | +3 | 111 |
| 27 | | 011 | | | +1 | 011 |
| 28 | | 100 | | | −1 | 010 |
| 29 | | 101 | | | −3 | 110 |
| 30 | | 110 | | | −5 | 100 |
| 31 | | 111 | | | −7 | 000 |
| 32 | 100 | 000 | +1 | 011 | −7 | 000 |
| 33 | | 001 | | | −5 | 100 |
| 34 | | 010 | | | −3 | 110 |
| 35 | | 011 | | | −1 | 010 |
| 36 | | 100 | | | +1 | 011 |
| 37 | | 101 | | | +3 | 111 |
| 38 | | 110 | | | +5 | 101 |

TABLE 1-continued

Truth Table for Gray-Coded Mapping

| | INPUT | | OUTPUT | | | |
|---|---|---|---|---|---|---|
| i | $c_5, c_4, c_3$ | $c_2, c_1, c_0$ | $B_2[i]$ | $b_5, b_4, b_3$ | $A_2[i]$ | $b_2, b_1, b_0$ |
| 39 | | 111 | | | +7 | 001 |
| 40 | 101 | 000 | +3 | 111 | +7 | 001 |
| 41 | | 001 | | | +5 | 101 |
| 42 | | 010 | | | +3 | 111 |
| 43 | | 011 | | | +1 | 011 |
| 44 | | 100 | | | −1 | 010 |
| 45 | | 101 | | | −3 | 110 |
| 46 | | 110 | | | −5 | 100 |
| 47 | | 111 | | | −7 | 000 |
| 48 | 110 | 000 | +5 | 101 | −7 | 000 |
| 49 | | 001 | | | −5 | 100 |
| 50 | | 010 | | | −3 | 110 |
| 51 | | 011 | | | −1 | 010 |
| 52 | | 100 | | | +1 | 011 |
| 53 | | 101 | | | +3 | 111 |
| 54 | | 110 | | | +5 | 101 |
| 55 | | 111 | | | +7 | 001 |
| 56 | 111 | 000 | +7 | 001 | +7 | 001 |
| 57 | | 001 | | | +5 | 101 |
| 58 | | 010 | | | +3 | 111 |
| 59 | | 011 | | | +1 | 011 |
| 60 | | 100 | | | −1 | 010 |
| 61 | | 101 | | | −3 | 110 |
| 62 | | 110 | | | −5 | 100 |
| 63 | | 111 | | | −7 | 000 |

Figure 5:
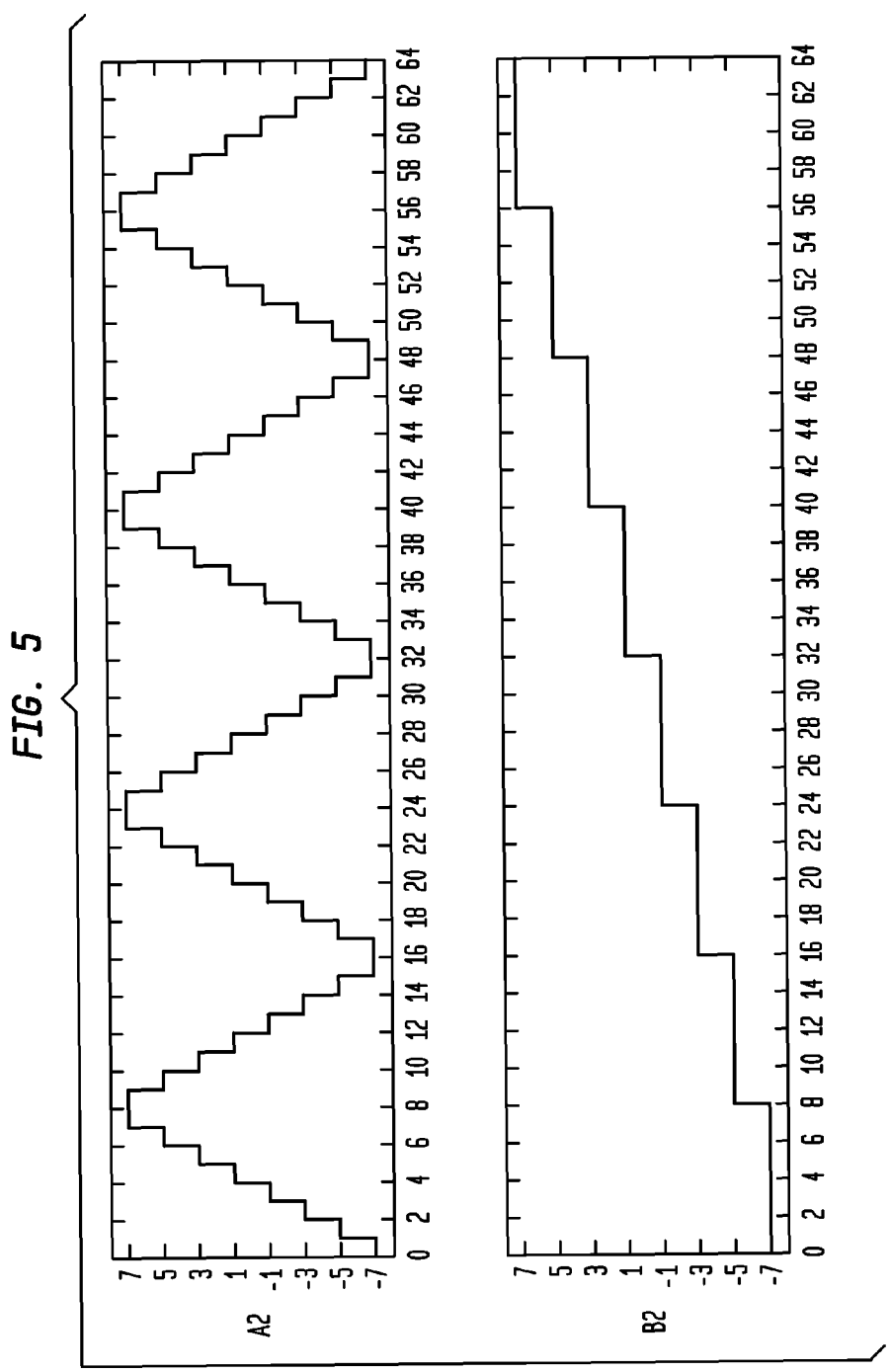
FIG. 5 shows an exemplary candidate variable scan for the exemplary implementation of FIG. 4.

FIG. 5 shows an exemplary candidate variable scan for the exemplary implementation of FIG. 4. As shown in FIG. 5, each of the two candidate variables, ($A_2$, $B_2$) undergoes a scan by mapper 304, wherein variable $B_2$ is scanned 8 times more slowly than $A_2$. As can be seen in FIG. 5, the entire scan of the two candidate variables ($A_2$, $B_2$) can be performed in 64 clock cycles. Equations (4-w) may be used to compute all 17 Euclidian sub-terms for each given ($A_2$, $B_2$) combination, i.e., for each iteration i, such that Equations (4o-r) may be used to find the various minimum metrics for all soft bits $L_k$.

The structure and operation of Coeff-calc 301 and EMC 305 will now be described. The vector-matrix notation of Equation (3) is reduced and the result separated into various coefficients, as shown in Equation (4a). The weight coefficients $W_{L1,2,3,4}$, $W_{S1}$, $W_{S2}$, and $W_{C1,2}$ are as given in Equations (5a-d):

$$w_{L1,2,3,4}\begin{pmatrix} w_{L1} \\ w_{L2} \\ w_{L3} \\ w_{L4} \end{pmatrix} = \begin{vmatrix} -2h_{I,11} & -2h_{Q,11} & -2h_{I,21} & -2h_{Q,21} \\ +2h_{Q,11} & -2h_{I,11} & +2h_{Q,21} & -2h_{I,21} \\ -2h_{I,12} & -2h_{Q,12} & -2h_{I,22} & -2h_{Q,22} \\ +2h_{Q,12} & -2h_{I,12} & +2h_{Q,22} & -2h_{I,22} \end{vmatrix} \cdot \begin{pmatrix} r_{I,1} \\ r_{Q,1} \\ r_{I,2} \\ r_{Q,2} \end{pmatrix}, \quad (5a)$$

$$w_{S1} = h_{I,11}^2 + h_{Q,11}^2 + h_{I,21}^2 + h_{Q,21}^2, \quad (5b)$$

$$w_{S2} = h_{I,12}^2 + h_{Q,12}^2 + h_{I,22}^2 + h_{Q,22}^2, \quad (5c)$$

$$\begin{pmatrix} w_{C1} \\ w_{C2} \end{pmatrix} = \begin{bmatrix} +2h_{I,12} & +2h_{Q,12} & +2h_{I,21} & +2h_{Q,21} \\ -2h_{Q,12} & +2h_{I,12} & +2h_{Q,21} & -2h_{I,21} \end{bmatrix} \cdot \begin{pmatrix} h_{I,11} \\ h_{Q,11} \\ h_{I,22} \\ h_{Q,22} \end{pmatrix}, \quad (5d)$$

where $h_{(.)}$ are channel impulse response coefficients, $r_{(.)}$ are receive signal coefficients, and subscripts I and Q represent the in-phase and quadrature component values, respectively.

The following Table 2 shows the relationship between the clock index i (which ranges from 0 to 63) the candidate variables $A_2$ and $B_2$. Table 2 shows the values of the first 24 and last 8 clock cycles, as follows:

TABLE 2

Clock Index-to-Candidate Variable ($A_2$, $B_2$) Mapping

| i | $B_2[i]$ | $A_2[i]$ | $B_2[i+1] - B_2[i]$ | $A_2[i+1] - A_2[i]$ | Case |
|---|---|---|---|---|---|
| 0 | −7 | −7 | 0 | +2 | Case 2 |
| 1 | | −5 | | | |
| 2 | | −3 | | | |
| 3 | | −1 | | | |
| 4 | | 1 | | | |
| 5 | | 3 | | | |
| 6 | | 5 | | | |
| 7 | | 7 | +2 | 0 | Case 1 |
| 8 | −5 | 7 | 0 | −2 | Case 3 |
| 9 | | 5 | | | |
| 10 | | 3 | | | |
| 11 | | 1 | | | |
| 12 | | −1 | | | |
| 13 | | −3 | | | |
| 14 | | −5 | | | |
| 15 | | −7 | +2 | 0 | Case 1 |
| 16 | −3 | −7 | 0 | +2 | Case 2 |
| 17 | | −5 | | | |
| 18 | | −3 | | | |
| 19 | | −1 | | | |
| 20 | | 1 | | | |
| 21 | | 3 | | | |
| 22 | | 5 | | | |
| 23 | | 7 | +2 | 0 | Case 1 |
| ... | ... | ... | ... | ... | ... |
| 56 | 7 | 7 | 0 | −2 | Case 3 |
| 57 | | 5 | | | |
| 58 | | 3 | | | |
| 59 | | 1 | | | |
| 60 | | −1 | | | |
| 61 | | −3 | | | |
| 62 | | −5 | | | |
| 63 | | −7 | don't care | don't care | Case 1 |

Thus, for any two consecutive clock cycles, i and i+1, either $B_2[i]$ is incremented by 2 (Case 1), $A_2[i]$ is incremented by 2 (Case 2), or $A_2[i]$ is decremented by 2 (Case 3). Hence, after defining these three cases mathematically as follows (where i=0, 1, . . . , 63):

$$\text{Case 1: } i = j \cdot 8 - 1, j = 1 \ldots 8, \quad (6a)$$

$$\text{Case 2: } j \cdot 16 \leq i \leq j \cdot 16 + 6, j = 0, \ldots 3, \quad (6b)$$

$$\text{Case 3: } j \cdot 16 + 8 \leq i \leq j \cdot 16 + 14, j = 0, \ldots, 3, \quad (6c)$$

the candidate sequence $B_2[i]$ and $A_2[i]$ can be specified recursively as:

$$B_2[i+1] = \begin{cases} B_2[i] + 2: & \text{Cases } 1 \\ B_2[i]: & \text{Cases } 2, 3 \end{cases}, \quad (7a)$$

$$A_2[i+1] = \begin{cases} A_2[i]: & \text{Case } 1 \\ A_2[i] + 2: & \text{Case } 2 \\ A_2[i] - 2: & \text{Case } 3 \end{cases}, \quad (7b)$$

where $A_2[0] = B_2[0] = 7$.

The Euclidian sub-terms defined by Equations (4l-4n) can be rewritten as a function of the clock index i, as shown in the following Equations (8a-c):

$$y_{A,l}[i] = w_{L1}\Omega_I + w_{S1}\Omega_I^2 + w_{C1}\Omega_I A_2[i] + w_{C2}\Omega_I B_2[i], \quad (8a)$$

$$y_{B,l}[i] = w_{L2}\Omega_l + w_{S1}\Omega_l^2 - w_{c2}\Omega_l A_2[i] + w_{C1}\Omega_l B_2[i], \quad (8b)$$

$$y_R[i] = w_{L3}A_2[i] + w_{L4}B_2[i] + w_{S2}A_2^2[i] + w_{S2}B_2^2[i]. \quad (8c)$$

By using the recursive definitions of $A_2[i]$ and $B_2[i]$ given in Equations (7a-b), the following recursive expressions for the Euclidian sub-terms may be obtained:

$$y_{A,l}[i+1] = \begin{cases} y_{A,l}[i] + 2\omega_{C2}\Omega_l: & \text{Case 1} \\ y_{A,l}[i] + 2\omega_{C1}\Omega_l: & \text{Case 2}, \\ y_{A,l}[i] - 2\omega_{C1}\Omega_l: & \text{Case 3} \end{cases} \quad (9a)$$

where:

$$y_{A,l}[0] = w_{L1}\Omega_l + w_{S1}\Omega_l^2 - 7w_{C1}\Omega_l - 7w_{C2}\Omega_l, \quad (9b)$$

and $$y_{B,l}[i+1] = \begin{cases} y_{B,l}[i] + 2\omega_{C1}\Omega_l: & \text{Case 1} \\ y_{B,l}[i] + 2\omega_{C2}\Omega_l: & \text{Case 2}, \\ y_{B,l}[i] - 2\omega_{C2}\Omega_l: & \text{Case 3} \end{cases} \quad (10a)$$

where:

$$y_{B,l}[0] = w_{L2}\Omega_l + w_{S1}\Omega_l^2 + 7w_{C2}\Omega_l - 7w_{C1}\Omega_l. \quad (10b)$$

Figure 6:
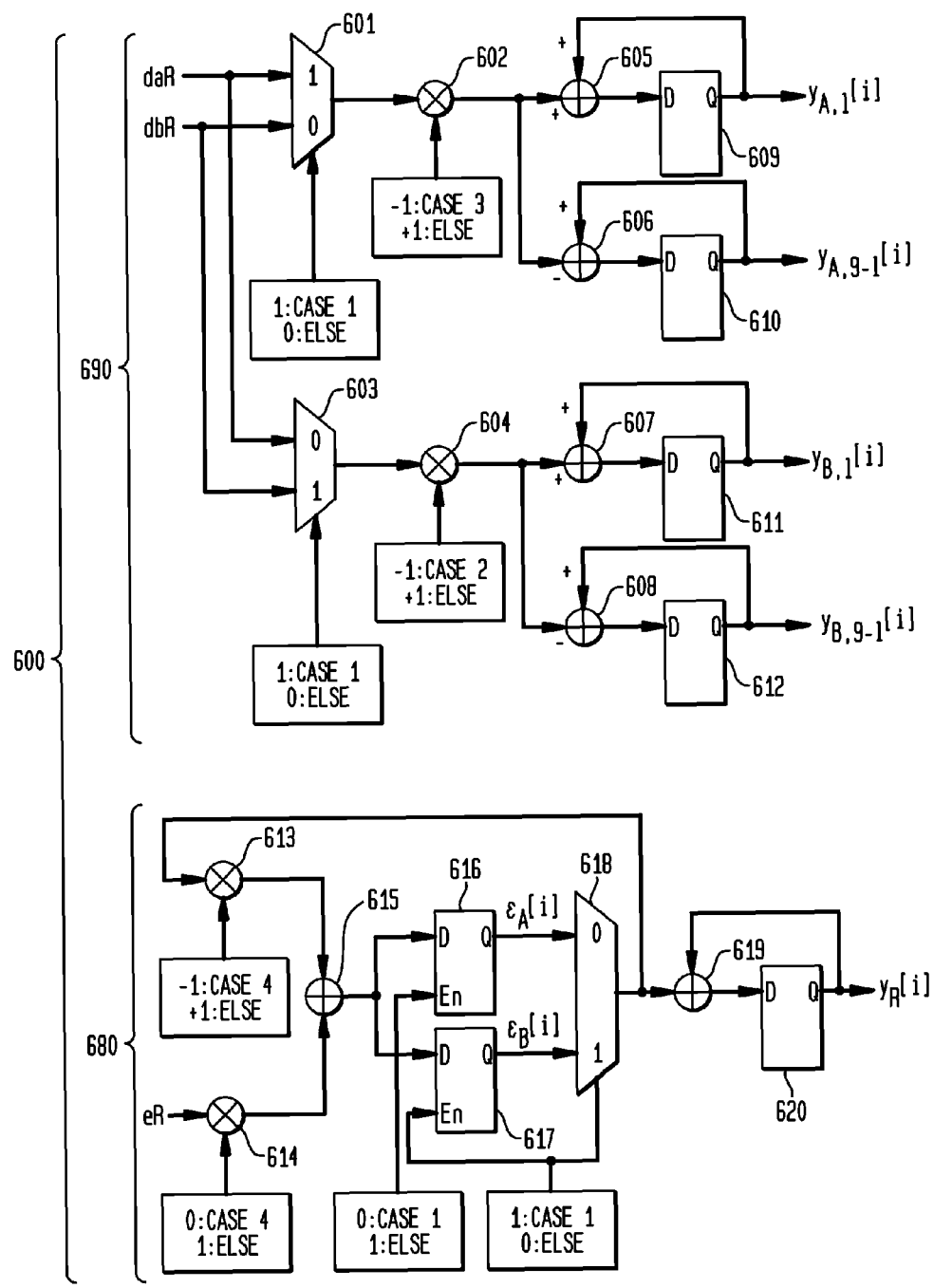
FIG. 6 shows an exemplary implementation for the Euclidian metric calculator of FIG. 3.

FIG. 6 shows an exemplary, implementation for the Euclidian metric calculator of FIG. 3. By exploiting the relation $\Omega_l = \Omega_{9-l}$ for $l=1, \ldots, 8$, the structure shown in the upper portion 690 of circuit 600 of FIG. 6, can be employed to the 16 Euclidian sub-terms $y_{A,l}[i], y_{B,l}[i]$ $l=1, \ldots, 8$) for each time instance i. Four in stantiations (l=1,2,3,4) of this structure are employed to generate the 16 Euclidian sub-terms. The inputs daR and dbR of the upper structure 690 of circuit 600 equal $2w_{C2}\Omega_l$ and $2w_{C1}\Omega_l$ for l=1,2,3,4 of the four instantiation Thus, for a n exemplary instantiation l=1, daR and dbR equal $-14w_{C2}$ and $-14w_{c1}$, respectively. The flip-flops of the upper structure 690 of circuit 600 of FIG. 6 are initially preset to the values defined by Equations (9b) and (10b), which initial values may be provided by coefficient calculator 301 of FIG. 3.

The remaining Euclidian sub-term $y_R[i]$ can also be recursively defined as:

$$y_R[i+1] = \begin{cases} y_R[i] + 2\omega_{L4} + 4\omega_{S2} + 4\omega_{S2}B_2[i], & \text{Case 1} \\ y_R[i] + 2\omega_{L3} + 4\omega_{S2} + 4\omega_{S2}A_2[i], & \text{Case 2}, \\ y_R[i] + 2\omega_{L3} + 4\omega_{S2} - 4\omega_{S2}A_2[i], & \text{Case 3} \end{cases} \quad (11a)$$

where $$y_R[0] = -7w_{L3} - 7w_{L4} + 98w_{S2}, \quad (11b)$$

which initial value may also be provided by coefficient calculator 301.

While the foregoing steps could be directly implemented using multipliers and adders for computing the terms $4w_{S2}B_2[i]$ and $4w_{S2}A_2[i]$, this embodiment of the present invention includes an implementation that does not require any multiplication operations during the search process, for simplicity of operation. Therefore, a second level of recursion is entered for $y_R[i]$. To this end, $\epsilon_A[i]$ and $\epsilon_B[i]$ are defined by the following Equations (12a) and (12b):

$$\epsilon_B[i] = \begin{cases} 2\omega_{L4} + 4\omega_{S2} + 4\omega_{S2}B_2[i] & \text{Case 1} \\ \text{undefined/don't care} & \text{Cases 2, 3} \end{cases}, \quad (12a)$$

and $$\epsilon_A[i] = \begin{cases} \text{undefined/don't care:} & \text{Case 1} \\ 2\omega_{L3} + 4\omega_{S2} + 4\omega_{S2}A_2[i] & \text{Case 2} \\ -2\omega_{L3} + 4\omega_{S2} - 4\omega_{S2}A_2[i] & \text{Case 3} \end{cases}. \quad (12b)$$

With the foregoing definitions, Equation (11a) can be rewritten as:

$$y_R[i+1] = \begin{cases} y_R[i] + \epsilon_B[i] & \text{Case 1} \\ y_R[i] + \epsilon_A[i] & \text{Cases 2, 3} \end{cases}. \quad (13)$$

One possible definition of $\epsilon_B[i]$ that complies with Equation (12a) may be given as:

$$\epsilon_B[i+1] = \begin{cases} \epsilon_B[i] + 8\omega_{S2} & \text{Case 1} \\ \epsilon_B[i] & \text{Cases 2, 3} \end{cases}, \quad (14)$$

where $\epsilon_B[0] = 2w_{L4} - 24w_{S2}$. For $\epsilon_A[i]$, it can be shown that $\epsilon_A[j \cdot 8] = -\epsilon_A[j \cdot 8 - 2]$ for $j=1 \ldots 8$.

Hence, the following may be obtained:

$$\epsilon_A[i+1] = \begin{cases} -\epsilon_A[i] & \text{for Case 4} \\ \epsilon_A[i] & \text{for Case 1}, \\ \epsilon_A[i] & \text{else} \end{cases} \quad (15a)$$

where:

$$\epsilon_A[0] = 2w_{L3}24w_{S2}, \quad (15b)$$

and Case 4 may be defined by Equation (16):

$$\text{Case4: } i = j \cdot 8 - 2, j = 1 \ldots 8. \quad (16)$$

An implementation of this doubly recursive mechanism for the continuous update of the Euclidian sub-term $y_R[i]$ is shown in the lower portion 680 of circuit 600 of FIG. 6, where the constant input eR equals $8W_{S2}$ and is provided by coefficient calculator 301. The flip-flops of the lower structure 680 of circuit 600 of FIG. 6 are initially preset to the values defined by Equations (11b), (14b), and (15b).

Based on the input vector r and channel impulse response matrix H, coeff-calc 301 generates the eR signal, the four daR signals, and the four dbR signals used by the four instantiations of the upper structure 690 of circuit 600 of FIG. 6. These signals are constant during the candidate scan that takes 64 clock cycles.

EMC 305, in this implementation, includes the lower portion 680 of circuit 600 and four instantiations of the upper circuit 690 of circuit 600, as shown in FIG. 6. EMC 305 receives the constant values daR, dbR, and eR from coeff-calc 301, as well as control signals generated by a controller (e.g., controller 309), whose input i is the 6-bit output c of the 6-bit counter 303, wherein the controller generates signals based on the following cases:

Case 1: $i=j\cdot 8-1, j=1\ldots 8$,

Case 2: $j\cdot 16 \leq i \leq j\cdot 16+6, j=0,\ldots,3$

Case 3: $j\cdot 16+8 \leq i \leq j\cdot 16+14, j=0\ldots,3$,

Case 4: $i=j\cdot 8-2, j=1\ldots 8$.

Multiplexer 601 of FIG. 6 selects and provides daR to multiplier 602 in Case 1, and, in all other cases, selects and provides dbR. Multiplier 602 inverts the sign of its input value in Case 3, and retains the sign of its input value in all other cases. The output of multiplier 602 is provided to combiner 605 and subtractor 606, to be summed with the values stored in flip-flops 609 and 610, respectively, and the augmented values are respectively stored in flip-flops 609 and 610. The values stored in flip-flops 609 and 610 are respectively fed back into combiner 605 and subtractor 606 and are also respectively provided to comparator 307 as $y_{A,i}[i]$ and $y_{A,9-i}[i]$:

Multiplexer 603 selects and provides dbR to multiplier 604 in Case 1, and, in all other cases, selects and provides daR. Multiplier 604 inverts the sign of its input value in Case 2, and retains the sign of its input value in all other cases. The output of multiplier 604 is provided to combiner 607 and subtractor 608, to be summed with the values stored in flip-flops 611 and 612, respectively, and the augmented values are respectively stored in flip-flops 611 and 612. The values stored in flip-flops 611 and 612 are respectively fed back into combiner 607 and subtractor 608 and are also respectively provided to comparator 307 as $y_{B,i}[i]$ and $y_{B,9-i}[i]$.

Multiplier 614 provides to combiner 615 a value of 0 in Case 4, and provides eR in all other cases. Multiplier 613 inverts the sign of its input value in Case 4, and retains the sign of its input value in all other cases. Combiner 615 provides to flip-flops 616 and 617 the sum of the output value of multipliers 613 and 614.

Not shown in FIG. 6 is that, in the embodiment illustrated, all of the flip-flops 609, 610, 611, 612, 616, 617, and 620 are controlled by the same clock signal. Flip-flops 616 and 617 have enable inputs, so their outputs change only if their respective enable inputs equal logical 1; otherwise, their previous outputs are kept. The previous output of flip-flop 616 is kept unchanged in Case 1, and provides the output of combiner 615 in all other cases. Flip-flop 617 provides the output of combiner 615 in Case 1, and the previous output of flip-flop 617 is kept unchanged in all other cases. Multiplexer 618 selects and provides to multiplier 613 and to combiner 619 the value stored in flip-flop 617 in Case 1, and selects and provides the value stored in flip-flop 616 in all other cases. Combiner 619 sums the output of multiplexer 618 with the contents of flip-flop 620 and provides the result to flip-flop 620 for storage. The value stored in flip-flop 620 is fed back into combiner 619 and is also provided to comparator 307 as $y_R[i]$.

As set forth in Equation (4j) and Equations (4o-r), two Euclidian metric terms are needed for each bit $b_k$ modulated in the MIMO subcarrier under consideration, i.e., the minimum y for which bit $b_k$ has value 0, and the minimum y for which $b_k$ has value 1. For each bit, one of the two minimum metric quantities will always be identical to the smallest Euclidian metric across all 4096 candidates (the "global minimum"), i.e., without constraints regarding any specific bit values. This is true because the best candidate variable combination, i.e., the hard-detected ML solution $(A_1,B_1,A_2,B_2)_{ML}$ leading to the global minimum $g=y_{ML}$, is equivalent to a corresponding bit-level representation $(b_0,\ldots b_{11})_{ML}$, also referred to herein as its "bit occupancy." In $(b_0,\ldots,b_{11})_{ML}$, each bit has either value $b_{k,ML}=0$ or $b_{k,ML}=1$, and by definition, the corresponding y is the smallest Euclidian term for this bit occupancy $b_k=b_{k,ML}$; otherwise, g would not be the global minimum. Therefore, it is not necessary to maintain two Euclidian terms per modulated bit in the exhaustive search process. It is sufficient to maintain the one and thus far only global minimum, and a second term per modulated bit for which the bit occupancy is inverse to that of the global minimum. This second term $n_k$ is also referred to herein as the "other" Euclidian minimum per bit k. By performing these steps throughout the search process, at the end of the search, the remaining L values can be generated by subtracting the global minimum g from the other term $n_k$ per bit k, or vice-versa, as will be described in further detail below.

Consider, for example, the prior-art, brute-force technique of calculating the metric y of Equation (4a) for each of 4096 different combinations of $(A_1,B_1,A_2,B_2)$ over 4096 different processing cycles. In one possible implementation, this would involve maintaining 24 different registers for the 24 minimum y values, one for each different value (i.e., 0 or 1) for each of the 12 different bits, where a first register stores the minimum y value over all combinations of $(A_1,B_1,A_2,B_2)$ for which bit 0 has a value of 0, a second register stores the minimum y value over all combinations of $(A_1,B_1,A_2,B_2)$ for which bit 0 has a value of 1, a third register stores the minimum y value over all combinations of $(A_1,B_1,A_2,B_2)$ for which bit 1 has a value of 0, and so on for all twelve bits and both values 0 and 1.

Since each combination of $(A_1,B_1,A_2,B_2)$ corresponds to a particular 12-bit value, only half of the 24 registers are candidates for updating during any given processing cycle. Moreover, if they value for the current combination of $(A_1,B_1,A_2,B_2)$ is the smallest y value so far (i.e., "the global minimum"), then all 12 of the current candidate registers will be updated with the same global minimum value, i.e., they value for the current combination of $(A_1,B_1,A_2,B_2)$.

This characteristic of updating twelve registers at a time whenever a new global minimum is found enables an implementation in which only 14 registers are maintained instead of 24: a "global min" register storing the overall minimum y value, a "bit-occupancy" register storing the 12-bit value for the combination of $(A_1,B_1,A_2,B_2)$ at which the global minimum occurred, and twelve "bit registers," one for each of the twelve bits. The term "bit occupancy" refers to the value of the bit(s) associated with a particular register. The global min register has a 12-bit bit occupancy, while each bit register has a 1-bit bit occupancy. If the first bit (i.e., the LSB) of the 12-bit bit-occupancy register has a value of 1, then the first bit register has a bit occupancy of 0 and the first bit register stores the minimum y value for all combinations of $(A_1,B_1,A_2,B_2)$ having a first bit of 0. If, on the other hand, the first bit of the 12-bit bit-occupancy register has a value of 0, then the first bit register has a bit occupancy of I and the first bit register stores the minimum y value for all combinations of $(A_1,B_1,A_2,B_2)$ having a first bit of 1. And similarly for each of the other 11 bit registers.

FIG. 7 shows a flow diagram 70 of processing that can be used to find the 24 minimum y values of Equation (4j) using only 14 registers: a global min register, a bit-occupancy register, and 12 bit registers. The processing of FIG. 7 can also be used for situations other than 12-bit combinations.

Table 3 shows a hypothetical scenario for 2-bit combinations of bit b1 and bit b2. Columns (2) and (3) show the values of bits b1 and b2 for the four different 2-bit combinations. Column (4) shows the corresponding metric y value for those combinations. (Note that the metric values used in this hypothetical scenario were selected to demonstrate qualitative features of the processing and are not necessarily intended to represent actual metric values.) In the prior-art technique, four different registers would be maintained to determine the metric values needed to determine soft output values for bits b1 and b2 using the 2-bit analog of Equation (4j). These four prior-art registers are represented in columns (5)-(8), where Register (b1=0) keeps track of the minimum y value for all combinations of (b1,b2) for which b1=0, Register (b1=1) keeps track of the minimum y value for all combinations of (b1,b2) for which b1=1, and similarly for Registers (b2=0) and (b2=1).

The global min register is initialized to the "maximum" metric value (i.e., 100) (step 71 of FIG. 7). Note that the bit occupancy of the global min register and the values in the two bit registers are not yet defined.

At Cycle 1, the metric value for the current combination (b1,b2)=(0,0) is generated (step 72). Since the current metric value (i.e., 90) is smaller than the previous global min value (i.e., 100) stored in the global min register (step 73), the current metric value is the new global minimum. As such, the bit occupancy of the global min register is defined to be (0,0), i.e., the bit combination corresponding to the global mini-

TABLE 3

Hypothetical Two-Bit Scenario

| (1) Cycle | (2) b1 | (3) b2 | (4) y | (5) Reg (b1 = 0) | (6) Reg (b1 = 1) | (7) Reg (b2 = 0) | (8) Reg (b2 = 1) | (9) Global Min. | (10) Bit Occup. | (11) Bit b1 | (12) Bit b2 |
|---|---|---|---|---|---|---|---|---|---|---|---|
| Init |   |   |   | 100 | 100 | 100 | 100 | 100 | N/A | N/A | N/A |
| 1 | 0 | 0 | 90 | 90 | 100 | 90 | 100 | 90 | (0, 0) | 100 | 100 |
| 2 | 0 | 1 | 60 | 60 | 100 | 90 | 60 | 60 | (0, 1) | 100 | 90 |
| 3 | 1 | 1 | 80 | 60 | 80 | 90 | 60 | 60 | (0, 1) | 80 | 90 |
| 4 | 1 | 0 | 70 | 60 | 70 | 70 | 60 | 60 | (0, 1) | 70 | 70 |

As indicated in Table 3, the four prior-art registers are initialized to a value greater than or equal to the highest possible metric value. (arbitrarily assumed to be 100 for this hypothetical scenario). At Cycle 1, they value for the combination (b1,b2)=(0,0) is 90. Since this combination has a b1 value of 0 and a b2 value of 0, Registers (b1=0) and (b2=0) are candidates for updating during Cycle 1. Since the current metric value (i.e., 90) is smaller than the value (i.e., 100) currently stored in each of those two registers, the current metric value is stored in those two registers.

At Cycle 2, the y value for the combination (b1,b2)=(0,1) is 60. Since this combination; has a b1 value of 0 and a b2 value of 1, Registers (b1=0) and (b2=1) are candidates for updating during Cycle 2. Since the current metric value (i.e., 60) is smaller than the value currently stored in each of those two registers (i.e., 90 for Register (b1=0) and 100 for Register (b2=1)), the current metric value is stored, in those two registers.

At Cycle 3, they value for the combination (b1,b2)=(1,1) is 80. Since this combination has a b1 value of 1 and a b2 value of 1, Registers (b1=1) and (b2=1) are candidates for updating during Cycle 3. Since the current metric value (i.e., 80) is smaller than the value (i.e., 100) currently stored in Register (b1=1), the current metric value is stored in that register. Note, however, that the current metric value (i.e., 80) is not smaller than the value (i.e., 60) currently stored in the other candidate register (i.e., Register (b2=1)). As such, the value in Register (b2=1) is not updated.

At Cycle 4, the y value for the combination (b1,b2)=(1,0) is 70. Since this combination has a b1 value of 1 and a b2 value of 0, Registers (b1=1) and (b2=0) are candidates for updating during Cycle 4. Since the current metric value (i.e., 70) is smaller than the value currently stored in each of those two registers (i.e., 80 for Register (b1=1) and 90 for Register (b2=0)), the current metric value is stored in those two registers.

Columns (9)-(12) of Table 3 represent, for the same scenario, a global mm register, a bit-occupancy register, and two bit registers (one for bit b1 and another for bit b2). The processing of this implementation is described in the context of both Table 3 and FIG. 7.

mum value (step 74). The bit occupancy of the global min register also implicitly defines the bit occupancies of the two bit registers. In particular, since the value of bit b1 in the global bit occupancy is 0, the bit occupancy of Register b1 is 1. Similarly, since the value of bit b2 in the global bit occupancy is 0, the bit occupancy of Register b2 is 1. The previous global min value (i.e., 100) is then stored in each bit register whose bit-occupancy definition changed (i.e., both Register b1 and Register b2) (step 75), and the current metric value is stored in the global min register (step 76).

Since not all combinations have been analyzed (step 77), at Cycle 2, the metric value for the current combination (b1, b2)=(0,1) is generated (step 72). Since the current metric value (i.e., 60) is smaller than the previous global min value (i.e., 90) (step 73), the current metric value is the new global minimum. As such, the bit occupancy of the global min register is re-defined to be (0,1), i.e., the bit combination corresponding to the new global minimum value (step 74). This new bit occupancy of the global min register also implicitly redefines the bit occupancy of Register b2. In particular, since the value of bit b2 in the new global bit occupancy is now 1, the bit occupancy of Register b2 is now 0. (Note that the bit occupancy of Register b1 has not changed, because the value of bit b1 in the global bit-occupancy register did not change.) The previous global min value (i.e., 90) is then stored in each bit register whose bit-occupancy definition changed (i.e., just Register b2) (step 75), and the current metric value is stored in the global min register (step 76).

Since not all combinations have been analyzed (step 77), at Cycle 3, the metric value for the current combination (b1, b2)=(1,1) is generated (step 72). Since the current metric value (i.e., 80) is not smaller than the previous global min value (i.e., 60) (step 73), the current metric value is not a new global minimum. In that case, the global min register is not updated, all bit occupancy definitions are kept the same as in the previous cycle, and processing flows to steps 78 and 79, which are implemented for every "candidate" bit register, i.e., each bit register whose bit occupancy corresponds to the current combination. Since the bit occupancy for Register b1 is 1 and since the value of b1 in the current combination is 1, Register b1 is a candidate bit register for the current combination. On the other hand, since the bit occupancy for Register b2 is 0 and since the value of b2 in the current combination is 1, Register b2 is not a candidate bit register for the current combination. As such, for only candidate Register b1, since the current metric value (i.e., 80) is smaller than the value (i.e., 100) stored in Register b1 (step 78), the current metric value is stored in Register b1 (step 79).

Since not all combinations have been analyzed (step 77), at Cycle 4, the metric value for the current combination (b1, b2)=(1,0) is generated (step 72). Since the current metric value (i.e., 70) is not smaller than the previous global min value (i.e., 60) (step 73), the current metric value is not a new global minimum. In that case, the global min register is not updated, all bit-occupancy definitions are kept the same as in the previous cycle, and processing flows to steps 78 and 79, which are implemented for every candidate bit register. Since the bit occupancy for Register b1 is 1 and since the value of b1 in the current combination is 1, Register b1 is a candidate bit register for the current combination. Furthermore, since the bit occupancy for Register b2 is 0 and since the value of b2 in the current combination is 0, Register b2 is also a candidate bit register for the current combination. As such, steps 78 and 79 are implemented independently for each of Registers b1 and b2. For Register b1, since the current metric value (i.e., 70) is smaller than the value (i.e., 80) stored in Register b1 (step 78), the current metric value is stored in Register b1 (step 79). Similarly, for Register b2, since the current metric value (i.e., 70) is smaller than the value (i.e., 90) stored in Register b2 (step 78), the current metric value is stored in Register b2 (step 79).

Since all combinations have now been analyzed (step 77), the processing of FIG. 7 terminates. At this point, the global register has a value of 60 corresponding to a global bit occupancy of (0,1), Register b1 has a value of 70 corresponding to a bit occupancy of 1, and Register b2 has a value of 70 corresponding to a bit occupancy of 0. These values can be used to derive the values of the four prior-art registers shown in columns (5)-(8) to solve the two-bit analog of Equation (4j).

As mentioned previously, the processing of FIG. 7 can be applied equally well to other scenarios, including the 12-bit brute-force scenario corresponding to Equations (4a) and (4j). In this case, the processing of FIG. 7 involves 14 registers (i.e., a global min register, a 12-bit global bit-occupancy register, and twelve bit registers) instead of the 24 prior-art registers.

The processing of FIG. 7 can also be applied to the sub-metric implementation of Equations (4k)-(4n). As in the brute-force implementation, for the sub-metric implementation of FIG. 3, comparator 307 maintains 14 registers: a global min register, a 12-bit global bit-occupancy register (e.g., using 12 different flip-flops), and 12 bit registers. In this sub-metric implementation, there are 64 different iterations, one for each different combination of $(A_2, B_2)$. For each iteration, step 72 of FIG. 7 involves the following operations:

Metric calculator 305 generates eight sub-metric $y_A$ values, eight sub-metric $y_B$ values, and one sub-metric $y_R$ value for the current combination of $(A_2, B_2)$ and passes all 17 sub-metric values to comparator 307; and Comparator 307 (i) selects the minimum of the eight sub-metric $y_A$ values and identifies the corresponding value of $A_1$; (ii) selects the minimum of the eight sub-metric $y_B$ values and identifies the corresponding value of $B_1$; (iii) defines the current combination of $(A_1, B_1, A_2, B_2)$ based on the value of $A_1$ from (i), the value of $B_1$ from (ii), and the value of $(A_2, B_2)$ for the current iteration; and (iv) generates the metric value for the current combination of $(A_1, B_1, A_2, B_2)$ as the sum of the selected minimum sub-metric $y_A$ value from (i), the selected minimum sub-metric $y_B$ value from (ii), and the sub-metric $y_R$ value.

The rest of the processing of FIG. 7 is analogous to that of the brute-force scenarios.

Figure 7A:
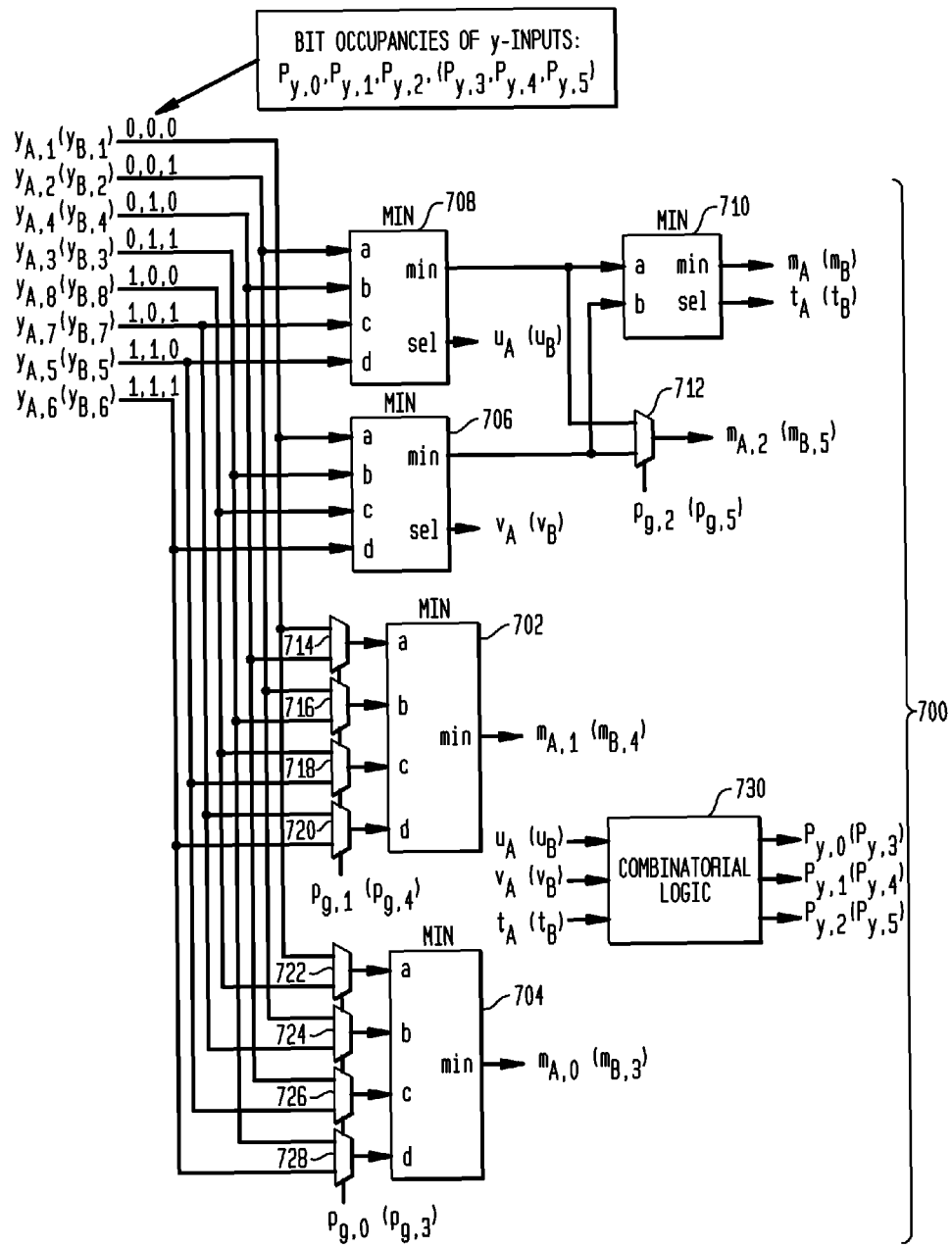
FIG. 7a shows an exemplary implementation for the first stage of the comparator of FIG. 3.
Figure 7B:
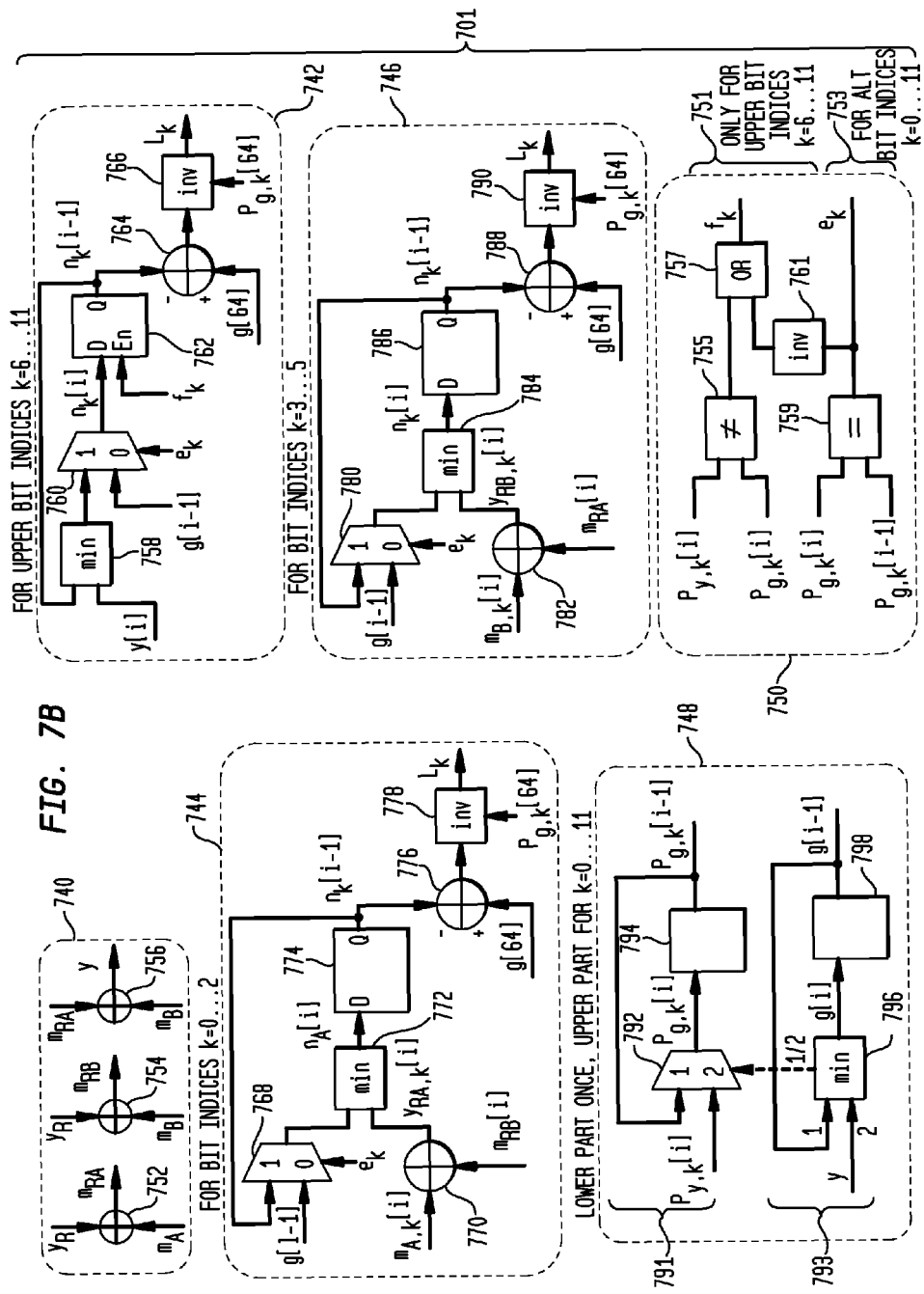
FIG. 7b shows an exemplary implementation for the second stage of the comparator of FIG. 3.

FIGS. 7a and 7b, respectively, illustrate first stage 700 and second stage 701 of an exemplary implementation for comparator 307 of FIG. 3 that generates soft-bit values $L(b_0)$ through $L(b_{11})$ in accordance with Equation (1). In this implementation, comparator 307 includes two instantiations of first stage 700 and multiple instantiations of the various sub-blocks 740, 742, 744, 746, 748, 750 of second stage 701. It is advantageous that, in this exemplary embodiment, the values $y_{A,1}, \ldots, y_{A,8}$ and $y_{B,1}, \ldots, y_{B,8}$ and $y_R$ are computed concurrently by EMC 305 and further processed (also concurrently) by comparator 307. In other words, during each clock cycle, the EMC 305 generates a set of 17 y-values $(y_{A,1}, \ldots, y_{A,8}, y_{B,1}, \ldots, y_{B,8}, y_R)$, which, during each clock cycle, comparator 307 processes, storing the results of this processing in its flip-flops (as shown in FIG. 7b). This concurrent processing is desirable so as to minimize the latency and throughput of the entire demapper.

As shown in FIG. 7a, a first stage 700 of the comparator includes minimizers 702, 704, 706, 708, and 710, multiplexers 712, 714, 716, 718, 720, 722, 724, 726, and 728, and combinatorial logic block 730.

Multiplexer 722 receives from EMC 305 the values $y_{A,1}$ and $y_{A,8}$, multiplexer 724 receives from EMC 305 the values $y_{A,2}$ and $y_{A,7}$, multiplexer 726 receives from EMC 305 the values $y_{A,4}$ and $y_{A,5}$, and multiplexer 728 receives from EMC 305 the values $y_{A,3}$ and $y_{A,6}$. Each of the respective multiplexers 722, 724, 726, 728 receives a control signal $p_{g,0}$ representing the bit occupancy for the global minimum, as determined by the second stage 701 of the comparator shown in FIG. 7b. Based on this control signal, miultiplexer 722 selects one of its received values for output as a, multiplexer 724 selects one of its received values for output as b, multiplexer 726 selects one of its received values for output as c, and multiplexer 728 selects one of its received values for output as d. Minimizer 704 receives as input values a, b, c, and d, which are respectively provided by multiplexers 722, 724, 726, 728, compares them, and outputs the smallest of the values as $m_{A,0}$.

Multiplexer 714 receives from EMC 305 the values $y_{A,i}$ and $y_{A,4}$, multiplexer 716 receives from EMC 305 the values $y_{A,2}$ and $y_{A,3}$, multiplexer 718 receives from EMC 305 the values $y_{A,5}$ and $y_{A,8}$, and multiplexer 720 receives from EMC 305 the values $y_{A,6}$ and $y_{A,7}$. Each of the respective multiplexers 714, 716, 718, 720 receives a control signal $p_{g,1}$ representing the bit occupancy for the global minimum, as determined by the second stage 701 of the comparator shown in FIG. 7b. Based on this control signal, multiplexer 714 selects one of its received values for output as a, multiplexer 716 selects one of its received values for output as b, multiplexer 718 selects one of its received values for output as c, and multiplexer 720 selects one of its received values for output as d. Minimizer 702 receives as input values a, b, c, and d, which are respectively provided by multiplexers 714, 716, 718, 720, compares them, and outputs the smallest of the values, as $m_{A1}$.

Minimizer 708 receives as input values a, b, c, and d, which are respectively the values $y_{A,2}, y_{A,4}, y_{A,7}$, and $y_{A,5}$ provided by EMC 305, compares them, and provides the smallest of the values as input a to multiplexer 712 and minimizer 710. Minimizer 708 further provides to, combinatorial logic 730 a selection signal $u_A$, which will be used to determine the bit occupancy of the smallest y input. Selection signal $u_A$ is 0 if a is the smallest input value, 1 if b is the smallest input value, 2 if c is the smallest input value, and 3 if d is the smallest input value.

Minimizer 706 receives as input values a, b, c, and d, which are respectively the values $y_{A,1}$, $y_{A,3}$, $y_{A,8}$, and $y_{A,6}$ provided by EMC 305, compares them, provides the smallest of the values as input b to multiplexer 712 and minimizer 710. Minimizer 706 further provides to combinatorial logic 730 a selection signal $v_A$, which will be used to determine the bit occupancy of the smallest y input. Selection signal $v_A$ is 0 if a is the smallest input value, 1 if b is the smallest input value, 2 if c is the smallest input value, and 3 if d is the smallest input value.

Minimizer 710 receives the values a and b from minimizers 708 and 706, respectively, compares them, outputs the smaller of the values as $m_A$ (the minimum value across all $y_{A,k}$ inputs), and further provides to combinatorial logic 730 a selection signal $t_A$, which will be used to determine the, bit occupancy of the smaller y input. Selection signal $t_A$ is 0 if a is the smaller input value, and 1 if b is the smaller input value.

Multiplexer 712 receives the values a and b from minimizers 708 and 706, as well as a control signal $p_{g,2}$ representing the bit occupancy for the global minimum, as determined by the second stage 701 of the comparator shown in FIG. 7b, and selects one of its received values for output as $m_{A,2}$ based on this control signal.

Combinatorial logic 730 receives selection signals $u_A$, $v_A$, and $t_A$ and, based on the following truth table provided as Table 4 (where "X" denotes unused values or "don't care"values), outputs control signals $p_{y,0}$, $p_{y,1}$, an $p_{y,2}$, which are the bit occupancies for the smallest y-input values (the "local" minimum).

TABLE 4

Truth Table for Selection Signals/Control Signals

| Inputs | | | Outputs | | |
|---|---|---|---|---|---|
| $t_A(t_B)$ | $u_A(u_B)$ | $v_A(v_B)$ | $p_{y,0}(p_{y,3})$ | $p_{y,1}(p_{y,4})$ | $p_{y,2}(p_{y,5})$ |
| 0 | 0 | X | 0 | 0 | 1 |
| 0 | 1 | X | 0 | 1 | 0 |
| 0 | 2 | X | 1 | 0 | 1 |
| 0 | 3 | X | 1 | 1 | 0 |
| 1 | X | 0 | 0 | 0 | 0 |
| 1 | X | 1 | 0 | 1 | 1 |
| 1 | X | 2 | 1 | 0 | 0 |
| 1 | X | 3 | 1 | 1 | 1 |

For example, if $u_A=1$ (which indicates that input b of minimizer 708 is the smallest value), and $t_A=0$ (which indicates that input a of minimizer 710 is the smaller value), then $y_{A,3}$ is the smallest y-input, and the combinatorial logic 730 outputs the bit occupancy of $y_{A,3}$, which is 0,1,0, and thus $p_{y,0}=0$, $p_{y,1}=1$, and $p_{y,2}=0$.

Advantageously, the same structure of the first stage 700 of the comparator, including minimizers 702, 704, 706, 708, and 710, and multiplexers 712, 714, 716, 718, 720, 722, 724, 726, and 728, which is described above as receiving from EMC 305 the values $y_{A,1}, \ldots, y_{A,8}$, and providing the values $m_{A,0}$, $m_{A,1}$, $m_{A,2}$, and $m_A$ and control signals $p_{y,0}$, $p_{y,1}$, and $p_{y,2}$, may also be used to receive from EMC 305 the values $y_{B,1}, \ldots y_{B,8}$, and accordingly, to provide the values $m_{B,3}$, $m_{B,4}$, $m_{B,5}$, and $m_B$, as indicated parenthetically throughout FIG. 7a. Thus, minimizers 704, 702, and 712, respectively, receive control signals for the global minimum $p_{g,3}$, $p_{g,4}$, and $p_{g,5}$, and combinatorial logic 730 receives control signals $u_B$, $v_B$, and $t_B$. Based on the truth table of Table 1, combinatorial logic 730' outputs control signals $p_{y,3}$, $p_{y,4}$, and $p_{y,5}$, which are the bit occupancies for the smallest y-input value (the "local" minimum). It should be understood that alternative structures for the first stage of the comparator are possible, e.g., employing only a single minimizer, or employing a combination of combiners, multipliers, and subtractors, instead of a plurality of minimizers.

As shown in FIG. 7b, a second stage 701 of the comparator includes six blocks 740, 742, 744, 746, 748, and 750, all of which may execute in parallel. In the embodiment illustrated, all flip-flops shown in FIG. 7b are controlled by the same common clock signal (not shown in FIG. 7b). In this embodiment, six instantiations of block 742 (for k 6, . . . , 11); three instantiations of block 744 (for k=0, 1, 2), three instantiations of block 746 (for k=3, 4, 5), twelve instantiations of block 748 (for k=0, . . . , 11), six instantiations of sub-block 751 (for k=6, . . . , 11), and twelve instantiations of sub-block 753 (for k=0, . . . , 11) are employed.

Block 740, which calculates local minimum y, includes combiners 752, 754, and 756. Combiner 752 receives the values of $y_R$ from EMC 305 and $m_A$ from minimizer 710 and provides the summed value as $m_{RA}$. Combiner 754 receives the values of $y_R$ from EMC 305 and $m_B$ from minimizer 710 and provides the summed value as $m_{RB}$. Combiner 756 receives the values of $m_{RA}$ from combiner 752 and $m_B$ from minimizer 710 and provides the summed value as y, i.e., the local minimum.

Block 742, which calculates $L_k$ for upper bit indices k= 6 . . . 11, includes minimizer 758, multiplexer 760, flip-flop 762, subtractor 764, and inverter 766. Minimizer 758 receives and outputs the smaller of the values of y[i] from EMC 305 and the value $n_k[i-1]$ (the other minimum Euclidian term $n_k$ of the previous iteration) provided by flip-flop 762. Multiplexer 760 receives the value output by minimizer 758 and the previous global minimum g[i-1.] from block 748, as well as control signal $e_k$ from block 750, and outputs one of these values as $n_k[i]$ based on control signal $e_k$. Flip-flop 762 receives $n_k[i]$ (the other minimum Euclidian term $n_k$ of the current iteration) from multiplexer 760 and control signal $f_k$ from block 750, and provides $n_k[i-1]$ to minimizer 758 and combiner 764, based on control signal $f_k$. After all candidates have been processed, at clock cycle i=64; subtractor 764 receives the global minimum g[63] from flip-flop 798, subtracts from it the value $n_k[i-1]$ provided by flip-flop 762, and provides the result to inverter 766. Inverter 766, which receives the control signal $p_{g,k}[63]$ from flip-flop 794, negates the result from subtractor 764 in the case of $p_{g,k}[63]=1$, and otherwise provides the unchanged result from subtractor 764, and in both cases providing $L_k$ as its output.

Block 744, which calculates $L_k$ for bit indices k=0 . . . 2, includes multiplexer 768, combiner 770, minimizer 772, flip-flop 774, subtractor 776, and inverter 778. Multiplexer 768 receives the previous global minimum g[i-1] from block 748, as well as control signal $e_k$ from block 750, and provides to minimizer 772 one of these values based on control signal $e_k$. Combiner 770 receives $m_{A,k}[i]$ from the respective one of minimizer 704, minimizer 702, or multiplexer 712, as well $m_{RB}[i]$ from combiner 754 and provides the resulting combined value $y_{RA,k}[i]$ to minimzer 772. Minimizer 772 provides the smaller of the respective values provided by multiplexer 768 and combiner 770 as $n_k[i]$ to flip-flop 774. The value stored in flip-flop 774 is provided to multiplexer 768 and to subtractor 776. After all candidates have been processed, at block cycle i=64, subtractor 776 receives the global minimum g[63] from flip-flop 798, subtracts from it the value $n_k[i-1]$ provided by flip-flop 774, and provides the result to inverter 778. Inverter 778, which receives the control signal $p_{g,k}[63]$ from flip-flop 794, negates the result from subtractor 776 in the case of $p_{g,k}[63]=1$, and otherwise provides the unchanged result from subtractor 764, and in both, cases providing provides $L_k$ as its output.

Block 746, which calculates $L_k$ for bit indices k=3 ... 5, includes multiplexer 780, combiner 782, minimizer 784, flip-flop 786, subtractor 788, and inverter 790. Multiplexer 780 receives the previous global minimum g[i−1] from block 748, as well as control signal $e_k$ from block 750, and provides to minimizer 784 one of these values based on control signal $e_k$. Combiner 782 receives $m_{B,k}[i]$ from the respective one of minimizer 704, minimizer 702, or multiplexer 712, as well as $m_{RA}[i]$ from combiner 752 and provides the resulting combined value $y_{RB,k}[i]$ to minimizer 784. Minimizer 784 provides the smaller of the respective values provided by multiplexer 780 and combiner 782 as $n_k[i]$ to flip-flop 786. The value stored in flip-flop 786 is provided to multiplexer 780 and to subtractor 788. After all candidates have been processed, at clock cycle i=64, subtractor 788 receives the global minimum g[63] from flip-flop 798, subtracts from it the value $n_k[i−1]$ provided by flip-flop 786, and provides the result to inverter 790. Inverter 790, which receives the control signal $p_{g,k}[63]$ from flip-flop 794, negates the result from subtractor 788 in the case of $p_{g,k}[63]=1$, and otherwise provides the unchanged result from subtractor 764, and in both cases providing $L_k$ as its output. It is noted that block 746 may be structurally identical to block 744, since these blocks are substantially the same, with all instances of "A" being replaced with "B," and vice-versa.

Block 748 contains sub-blocks 791 and 793. Sub-block 793, which includes minimizer 796 and flip-flop 798, calculates g[i−1] and executes only once per candidate scan. (It is noted that, in this embodiment, all of the flip-flops that have enable signals, in all of the figures, execute only once per each candidate, provided their enable signal is 1. This is because all of the flip-flops are controlled by the same common clock signal, which is not shown in the figures.) In sub-block 793, minimizer 796 receives y from combiner 756 and g[i−1] from flip-flop 798 and provides the smaller of the respective values as g[i] to flip-flop 798. Minimizer 796 also generates and provides to multiplexer 792 a control signal indicating which of its input values was determined to be the smaller value. Sub-block 791, which includes multiplexer 792 and flip-flop 794, calculates $P_{g,k}[i−1]$. In sub-block 791, multiplexer 792 receives $p_{y,k}[i]$ from combinatorial logic 730 and the contents of flip-flop 794, as well as the control signal from minimizer 796, and based on the control signal, provides the selected value as $p_{g,k}[i]$ to flip-flop 794, which stores and provides the received value as $p_{g,k}[i−1]$.

Block 750 includes logic for generating control signals $e_k$ and $f_k$ and includes sub-blocks 751 and 753. In sub-block 753 EQUAL block 759 receives $p_{g,k}[i]$ from multiplexer 792 and $p_{g,k}[i−1]$ from flip-flop 794, and provides the result of the operation as control signal $e_k$. In sub-block 751 NOT EQUAL block 755 receives $p_{y,k}[i]$ from combinatorial logic 730 and $p_{g,k}[i]$ from multiplexer 792, and provides the result of the operation, along with the inverse of signal $e_k$, which is generated by inverter 761, to OR block 757. OR block 757 provides the result of the operation as control signal $f_k$.

Figure 8A:
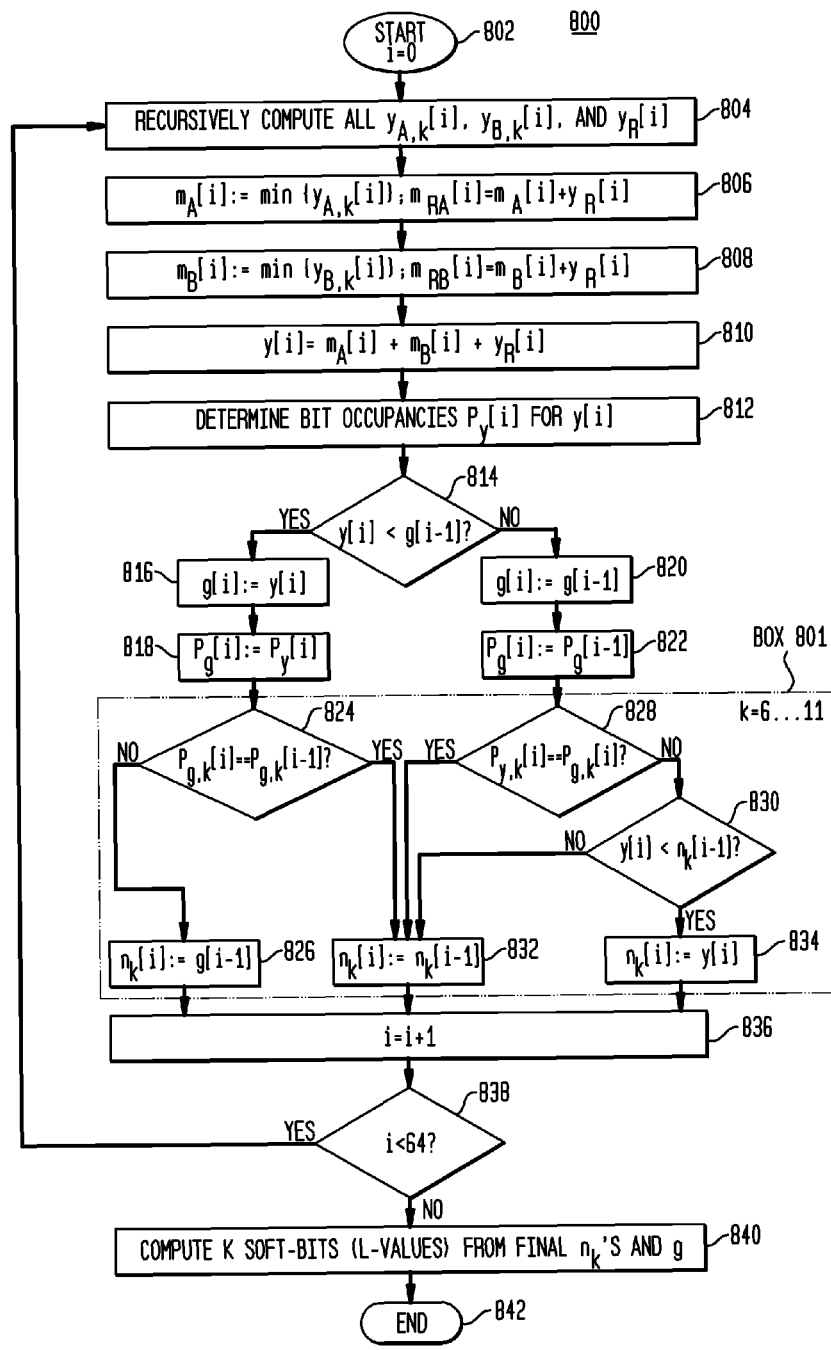
FIGS. 8a and 8b show a flowchart of an exemplary mode of operation for the comparator of FIG. 3.

With reference now to the flowchart of FIGS. 8a and 8b, an exemplary mode of operation for comparator 307 to effect the minimum search will now be described. As shown in FIG. 8a, the process begins at block 802, wherein the value i is intialized to zero. Next, at block 804, the various Euclidian subterms $y_{A,k}[i]$, $y_{B,k}[i]$, and $y_R[i]$ are recursively computed. Next, at blocks 806, 808, 810, some auxiliary variables are calculated, in order to implement the expressions of Equations (4o-r). At block 806, $m_A[i]$ is assigned the minimum of $y_{A,k}[i]$, and $m_{RA}[i]$ is assigned the value of $m_A[i]+y_R[i]$, which represents the newly found minimum plus the current contents of the $y_R$ register. At block 808, $m_B[i]$ is assigned the Minimum of $y_{B,k}[i]$, and $m_{RB}[i]$ is assigned the value of $m_B[i]+y_R[i]$, which represents the newly found minimum plus the current contents of the $y_R$ register. At block 810, y[i], which is the overall local minimum (i.e.; $y(A_1, B_1, A_2, B_2)$ minimized over all possible $A_1$ and $B_1$ but for fixed $A_2[i]$ and $B_2[i]$), is assigned the summed value of the three subterms $m_A[i]+m_B[i]+y_R[i]$. After the auxiliary variables are calculated, the bit occupancies for all 12 bits in-the local minimum y are calculated given the following Equation (17):

$$p_y Occ(y)=[p_{y,0} p_{y,1} \ldots p_{y,11}] \in \{0,1\}^{12}. \qquad (17)$$

The lower six entries of $P_y$ are extracted from the operations carried out by the minimizers generating $m_A$ and $m_B$, and the upper six entries correspond to the six counter bits i, expressed in Gray-coded/saw-tooth representation. These bit occupancies $p_{y,}[i]$ are determined for y[i] at block 812. Next, at block 814, a determination is made whether the local minimum y[i] is smaller than the previous global minimum g[i−1], in which case the new global minimum will be used, and the method proceeds to block 816 for g and the bit occupancies $p_y$ for the global minimum to be updated. At block 816, g[i] is assigned the value of y[i], and subsequently, at block 818, $p_g[i]$ is assigned the value of $p_y[i]$.

If it is determined at block 814 that y[i] is not less than g[i−1], i.e., the local minimum is greater than the previous global minimum, then the existing global minimum and corresponding bit occupancies will be kept. The method next proceeds to block 820, wherein g[i] is assigned the value of g[i−1]. Next, at block 822, pg[i] is assigned the value of pg[i−1].

The following steps depend on the bit index k and are carried out in parallel for all k. Accordingly, it should be noted that the blocks of the flowchart of FIG. 8a that are shown in box 801, which correspond to upper bits k=6 ... 11 (i.e., the bits modulated onto $A_2$ and $B_2$) and Equations (4q and 4r), are performed in parallel with the blocks of the flowchart of FIG. 8b shown in box 802, which correspond to lower bits k= 0 ... 5. Following block 818, at block 824, a determination is made whether $p_{g,k}[i]$ is equal to $p_{g,k}[i−1]$, in which case the method proceeds to block 832, wherein $n_k[i]$, is assigned the value of $n_k[i−1]$.

If, for bit k, the bit occupancy remains unchanged from the previous global minimum to the new global minimum, then no potential update becomes necessary for the other minimum Euclidian term, $n_k[i]$, which relates to the kth bit occupancy being inverse to that of the new (and old) globalminimum. This is because y has already been used for the new global minimum, defining a new global bit occupancy for k, and the old global minimum g[i−1] has the same bit occupancy for k as the new g, such that it is useless for $n_k$. If, however, the bit occupancy for k changes, then the new other Euclidian term should be given by the old global minimum: By definition, g[i−1] is the smallest term so far with the appropriate bit occupancy. Thus, if it is determined at block 824 that $p_{g,k}[i]$ is not equal to $p_{g,k}[i−1]$, then the method proceeds to block 826, wherein $n_k[i]$ is assigned the value of g[i−1].

It should be noted that the local minimum may still serve as the other Euclidian term for bit k. If the (old and) new bit occupancy for k is identical to the bit-occupancy for k in the local minimum y, then the local minimum y is useless for a possible update of $n_k$. Accordingly, at block 828, a determination is made whether $p_{y,k}[i]$ is equal to $p_{g,k}[i]$, in which case the method proceeds to block 832. If, at block 828, it is determined that $p_{y,k}[i]$ is not equal to $p_{g,k}[i]$, then the method proceeds to block 830, wherein a determination is made whether y[i] is less than $n_k[i-1]$, in which case the method proceeds to block 834. At block 834, $n_k[i]$ is assigned the value of y[i]. If, at block 830, it is determined that y[i] is not less than $n_k[i-1]$, i.e., y has the appropriate bit occupancy, namely, the inverse of the (old and) new global bit occupancy for k, then the method proceeds to block 832. Thus, y is only used for an update to $n_k$ when it is smaller than the previous $n_k$. Otherwise, the old $n_k$ is again retained.

Figure 8B:
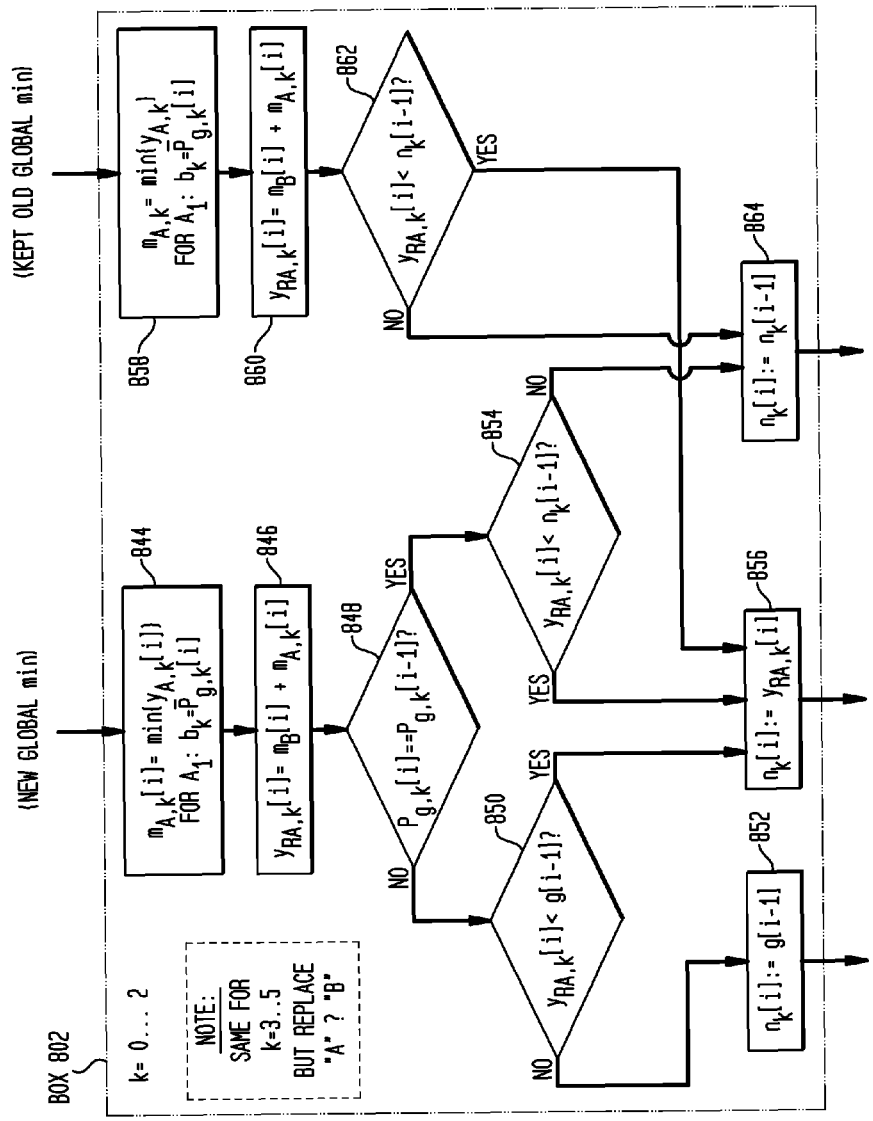

Referring now to FIG. 8b, box 802 illustrates the blocks that execute concurrently with those of box 801. The process blocks of box 802 are executed for each k=0 . . . 2 (implementing Equation (4o)), as shown in FIG. 8b, and the same blocks are executed for each k=3 . . . 5 (implementing Equation (4p)), but with all instances of "A" substituted for "B", and vice-versa. If a new global minimum g has been found, then the local minimum having a bit occupancy k inverse to the one found for the new global minimum is selected from all of the local Euclidian terms that scans (employing parallelization) all possible $A_1$ and $B_1$ for given $A_1[i], B_1[i]$. Hence, for any bit in $A_1$ (k=0 . . . 2), the smallest $y_{A,1}$ value needs to be selected under this bit occupancy constraint. The overall Euclidian term is then generated by adding this minimum to the overall minimum $m_B$ (which is not a function of $A_1$) and the value in the register $y_R$, yielding $y_{RA,k}$. Accordingly, following block 818, at block 844, $m_{A,k}[i]$ is assigned the value of the minimum of $y_{A,k}[i]$ for $A_1$: $b_k$=the inverse of $p_{g,k}[i]$. Next, at block 846, $y_{RA,k}$ is assigned the valuie of $m_B[i]$+ $m_{A,k}[i]$. If the bit occupancy k of the global minimum has changed in replacing the old global minimum with the local minimum, then $y_{RA,k}$ has the same bit occupancy as thee previous global minimum (the previous $n_k$ is not needed, because it hasp the wrong bit occupancy). Hence, a comparison is carried out between $p_{g,k}[i]$ and $p_{g,k}[i-1]$, and the smaller term is stored as the new other minimum term, $n_k$. However, if the bit occupancies for k remain the same between the old and new global minima, then $y_{RA,k}$ has the same bit occupancy as the previous $n_k$, so that one of these two terms will become the new $n_k$. Thus, at block 848, a determination is made whether $p_{g,k}[i]$ is equal to $p_{g,k}[i-1]$, in which case the method proceeds to block 854, wherein a determination is made whether $y_{RA,k}[i]$ is less than $n_k[i-1]$. If it is determined at block 854 that $y_{RA,k}[i]$ is less than $n_k[i-1]$, the method proceeds to block 856, wherein $n_k[i]$ is assigned the value of $y_{RA,k}[i]$. If it is determined at block 854 that $y_{RA,k}[i]$ is not less than $n_k[i-1]$, then the method proceeds to block 864, wherein $n_k[i]$ is assigned the value of $n_k[i-1]$. If it is determined at block. 848 that $p_{g,k}[i]$ is not equal to $p_{g,k}[i-1]$, then the method proceeds to block 850, wherein a determination is made whether $y_{RA,k}$ is less than g[i-1]. If at block 850, it is determined that $y_{RA,k}$ is less than g[i-1], then the method proceeds to block 856. If, at block 850, it is determined that $y_{RA,K}$ is not less than g[i-1], then the method proceeds to block 852, wherein $n_k[i]$ is assigned the value of g[i-1].

If the old global minimum g has not been displaced by the local minimum y, then $y_{RA,k}$ is again computed by selection from the $y_A$ values exhibiting the correct bit occupancy. Since, in this case, the global minimum has not changed, the bit occupancies in the global minimum have not changed, either, and therefore, $y_{RA,k}$ is still an eligible candidate for the updated $n_k$. The outcome of which variable is stored as the new $n_k$ is, determined as between the old $n_k$ and the current $y_{RA,k}$. Accordingly, following block 822, at block 858, $m_{A,k}$ is assigned the minimum of $y_{A,k}$ for $A_1$: $b_k$=the inverse of $p_{g,k}[i]$.

Next, at block 860, $y_{RA,k}[i]$ is assigned the value of $m_B[i]$+ $m_{A,k}[i]$. Next, at block 862, a determination is made whether $y_{RA,k}[i]$ is less than $n_k[i-1]$, in which case the method proceeds to block 856. If, at block 862, it is determined that $y_{RA,k}[i]$ is not less than $n_k[i-1]$, then the method proceeds to block 864.

As mentioned above, after the foregoing blocks of box 802 have been executed for each k=0 . . . 2, the blocks of box 802 are executed once again for each k=3 . . . 5, with all instances of "A" substituted for "B", and vice-versa.

Returning to FIG. 8a, following blocks 826, 832, 834, 852, 856, and 864, at block 836, the value of i is incremented by one, for the next iteration, and the process repeats until all possible values for $A_2$ and $B_2$ have been scanned. Then, the contents of the global minimum g and the other registers $n_k$ can be used to compute the final L values. Thus, at block 838, a determination is made whether i is less than 64, in which case, the method loops back, returning to block 804. If, at block 838, it is determined that i is not less than 64, then the method proceeds to block 840, wherein the k soft bits (L values) are computed, based on the differences between the final $n_k$'s and g. Finally, the process ends at block 842, at which point the entire, SO MLD demapping process has been completed in a mere 64 clock cycles (not including the coefficient calculations at the beginning of the candidate scan, some or all of which may be calculated and/or stored at each instantiation).

A multiple-branch wireless receiver operating in accordance with one or more embodiments of the present invention may provide one or more of the following; advantages. MIMO mapping employing the SO MLD method described herein reduces the complexity and power consumption of circuits generating candidate transmit vectors, while maintaining a relatively rapid computation and high probability of detection of the receiver. The inherent parallelization of the implementation of the candidate scanning algorithm in certain embodiments of the present invention permits 12 soft bits contained in a given 2-by-$N_r$ MIMO subcarrier to be computed in 64 clock cycles, rather than the 4096 cycles that would ordinarily be required to scan each of the candidates one-by-one. Thus, the area and cost required to implement the overall demapping structure are substantially reduced.

It should be understood that certain embodiments of the present invention may have utility in demapping schemes other than MIMO and data encoding schemes other than 64-QAM (i.e., two antennas, with 6 bits per antenna). For example, the invention may be used with other rectangular QAM constellations, including 4-QAM (2 bits per transmit antenna), 16-QAM (4 bits per transmit antenna), 256-QAM (8 bits per transmit antenna), 1024-QAM (10 bits per transmit antenna), and the like. It should also be understood that numbers of Euclidian sub-terms other than the three described herein ($y_A$, $y_B$, and $y_R$) may be used in other embodiments of the present invention.

The present invention has been described in the context of implementations that generate metric values that represent distances between a received symbol and the ideal symbols of a symbol constellation, where the minimum metric value indicates the ideal symbol that is closest to the received symbol. In alternative implementations, a metric value could be used for which higher metric values correspond to closer ideal symbols. In that case, the maximum metric value would indicate the closest ideal symbol. In order to cover both types of implementations, the invention is claimed in terms of "extremum metric values," which term covers both minimum and maximum metric values.

While certain functions of blocks of the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the inventions as expressed in the following claims.

What is claimed is:

1. A receiver-implemented method for generating soft bit values for a multi-bit symbol encoded in one or more received signals, the method comprising:
   (a) for a plurality of different combinations of multiple bit values, the receiver iteratively generating, for each combination, a metric value based on the one or more received signals;
   (b) for each iteration, the receiver maintaining:
      a global extremum register containing a global extremum of the metric values;
      a bit occupancy for the global extremum register; and
      a plurality of bit $b_k$ registers, one for each bit $b_k$ in the symbol, wherein each bit $b_k$ register contains an extremum of the metric values corresponding to combinations of multiple bit values whose bit $b_k$ value is inverse to that of the bit $b_k$ value of the bit occupancy for the global extremum register; and
   (c) the receiver generating, for each bit $b_k$ in the symbol, a soft bit value based on a difference between the value in the global extremum register and the value in the corresponding bit $b_k$ register.

2. The method of claim 1, wherein:
   each metric value corresponds to a different combination of values of n components, n>1;
   each metric value is generated by generating and combining two or more sub-metric values;
   each sub-metric is a function of one or more of the n components; and
   at least one sub-metric value is a function of fewer than all n components.

3. The method of claim 1, wherein, for a current combination of multiple bit values:
   if a current metric value is outside a previous global extremum metric value stored in the global extremum register, then:
      the bit occupancy of the global extremum register is updated based on the current combination;
      for each bit $b_k$ that changed value in the updated bit occupancy, the previous global extremum metric value is stored in the corresponding bit $b_k$ register; and
      the current metric value is stored in the global extremum register; and
   if the current metric value is not outside the previous global extremum metric value stored in the global extremum register, then:
      the bit occupancy of the global extremum register is not updated;
      the previous global extremum metric value is not changed; and
      the current metric value is stored in a bit $b_k$ register, if (1) the current metric value is outside a previous metric value stored in the bit $b_k$ register and (2) the bit occupancy of the bit $b_k$ register matches the corresponding bit $b_k$ in the current combination.

4. The method of claim 1, wherein:
   the symbol has 12 bits; and
   the global extremum register, a 12-bit bit occupancy for the global extremum register, and 12 bit $b_k$ registers are maintained.

5. The method of claim 1, wherein the different combinations of multiple bit values are generated in a sequence such that each pair of consecutive combinations differs by a single bit.

6. The method of claim 1, wherein:
   the multi-bit symbol corresponds to two rectangular QAM symbols having a first real component A1, a first imaginary component B1, a second real component A2, and a second imaginary component B2.

7. The method of claim 6, wherein:
   one of the rectangular QAM symbols is generated at a first transmit antenna, and the other rectangular QAM symbol is generated at a second transmit antenna.

8. The method of claim 1, further comprising:
   calculating, for at least one symbol, a set of coefficients representing symbol and channel characteristics; and
   generating the metric values based on the set of coefficients.

9. The method of claim 1, wherein each of the metric values is generated based on an error between the received symbol and a combination of multiple bit values.

10. The method of claim 9, wherein the error is Euclidian distance, and the metric value is an error metric representing minimum squared Euclidian distance.

11. An apparatus for generating soft bit values for a multi-bit symbol encoded in one or more received signals, the apparatus comprising:
   (a) means for iteratively generating, for each of a plurality of different combinations of multiple bit values, a metric value based on the one or more received signals;
   (b) means for maintaining, for each iteration:
      a global extremum register containing a global extremum of the metric values;
      a bit occupancy for the global extremum register; and
      a plurality of bit $b_k$ registers, one for each bit $b_k$ in the symbol, wherein each bit $b_k$ register contains an extremum of the metric values corresponding to combinations of multiple bit values whose bit $b_k$ value is inverse to that of the bit $b_k$ value of the bit occupancy for the global extremum register; and (c) means for generating, for each bit $b_k$ in the symbol, a soft bit value based on a difference between the value in the global extremum register and the value in the corresponding bit $b_k$ register.

12. The apparatus of claim 11, further comprising:
means for calculating, for at least one symbol, a set of coefficients representing symbol and channel characteristics;
wherein the metric values are generated based on the set of coefficients.

13. The apparatus of claim 11, further comprising:
means for generating the plurality of combinations of multiple bit values.

14. The apparatus of claim 11, wherein the different combinations of multiple bit values are generated in a sequence such that each pair of consecutive combinations differs by a single bit.

15. The apparatus of claim 11, wherein:
the multi-bit symbol corresponds to two rectangular QAM symbols having a first real component A1, a first imaginary component B1, a second real component A2, and a second imaginary component B2.

16. An apparatus for generating soft bit values for a multi-bit symbol encoded in one or more received signals, the apparatus comprising:

(a) a metric calculator adapted to iteratively generate, for each of a plurality of different combinations of multiple bit values, a metric value based on the one or more received signals; and (b) a comparator adapted to maintain, for each iteration:

a global extremum register containing a global extremum of the metric values;
a bit occupancy for the global extremum register; and
a plurality of bit $b_k$ registers, one for each bit $b_k$ in the symbol, wherein each bit $b_k$ register contains an extremum of the metric values corresponding to combinations of multiple bit values whose bit $b_k$ value is inverse to that of the bit $b_k$ value of the bit occupancy for the global extremum register, wherein:

the comparator is further adapted to generate, for each bit $b_k$ in the symbol, a soft bit value based on a difference between the value in the global extremum register and the value in the corresponding bit $b_k$ register.

17. The apparatus of claim 16, further comprising:
a coefficient calculator adapted to calculate, for at least one symbol, a set of coefficients representing symbol and channel characteristics;
wherein the metric values are generated based on the set of coefficients.

18. The apparatus of claim 16, further comprising:
a mapper adapted to generate the plurality of combinations of multiple bit values.

19. The apparatus of claim 16, wherein the different combinations of multiple bit values are generated in a sequence such that each pair of consecutive combinations differs by a single bit.

20. The apparatus of claim 16, wherein:
the multi-bit symbol corresponds to two rectangular QAM symbols having a first real component A1, a first imaginary component B1, a second real component A2, and a second imaginary component B2.

* * * * *